(12) United States Patent
Presti et al.

(10) Patent No.: US 10,396,673 B1
(45) Date of Patent: Aug. 27, 2019

(54) DC-TO-DC CONVERTER CONTROLLERS, DC-TO-DC CONVERTERS, AND ASSOCIATED METHODS

(71) Applicant: Maxim Integrated Products, Inc., San Jose, CA (US)

(72) Inventors: Armando Presti, Acireale (IT); Antonio Magazzu, Messina (IT); Sean Philip Gold, Sunnyvale, CA (US); Filippo Guagliardo, San Jose, CA (US); Issac Siavashani, Sunnyvale, CA (US); Henry Dinh, San Jose, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 0 days.

(21) Appl. No.: 16/000,188

(22) Filed: Jun. 5, 2018

Related U.S. Application Data

(60) Provisional application No. 62/515,338, filed on Jun. 5, 2017.

(51) Int. Cl.
| | |
|---|---|
| H02M 3/158 | (2006.01) |
| H02M 3/335 | (2006.01) |
| H02M 1/08 | (2006.01) |
| H02M 1/00 | (2006.01) |

(52) U.S. Cl.
CPC ......... H02M 3/33569 (2013.01); H02M 1/08 (2013.01); H02M 2001/0025 (2013.01)

(58) Field of Classification Search
CPC ... G05F 1/56; G05F 3/26; G05F 1/461; G05F 3/30; H03K 5/24; Y10S 23/901
USPC ......... 323/311–316, 222, 225; 327/143, 308, 327/538, 539, 541, 542
See application file for complete search history.

(56) References Cited

U.S. PATENT DOCUMENTS

| | | | | |
|---|---|---|---|---|
| 7,016,203 | B2* | 3/2006 | Xu | H02M 3/33592 363/21.04 |
| 7,417,875 | B2* | 8/2008 | Chandrasekaran | H02M 3/33592 323/356 |
| 7,957,160 | B2* | 6/2011 | Babcock | H02M 7/497 363/131 |
| 8,710,810 | B1* | 4/2014 | McJimsey | H02M 3/1584 323/272 |
| 9,107,690 | B2* | 8/2015 | Bales, Jr. | A61B 17/320092 |
| 9,606,559 | B2* | 3/2017 | Ozawa | G05F 1/575 |
| 9,762,134 | B2* | 9/2017 | Deboy | H02M 3/33592 |
| 9,991,778 | B2* | 6/2018 | Krolak | H02M 7/537 |

* cited by examiner

*Primary Examiner* — Rajnikant B Patel
(74) *Attorney, Agent, or Firm* — Lathrop Gage LLP

(57) ABSTRACT

A DC-to-DC converter controller configured to generate phase control signals to control a plurality of power stages of a DC-to-DC converter where each power stage includes two phases. The DC-to-DC converter controller is configured to generate the phase control signals in a manner which (a) balances magnitude of current processed among the two phases of each power stage and (b) balances magnitude of current processed among the plurality of power stages.

20 Claims, 16 Drawing Sheets

DC-TO-DC CONVERTER CONTROLLERS, DC-TO-DC CONVERTERS, AND ASSOCIATED METHODS

RELATED APPLICATIONS

This application claims benefit of priority to U.S. Provisional Patent Application Ser. No. 62/515,338, filed on Jun. 5, 2017, which is incorporated herein by reference.

BACKGROUND

There is substantial need for direct current to direct current (DC-to-DC) converters. For example, power distribution busses in enterprise-grade information technology equipment commonly operate at a relatively high voltage, such as 48 volts, to help minimize magnitude of current carried by these busses. Many loads in information technology equipment, however, operate at a low voltage. For example, modern microprocessors often include a processor core that operates at a voltage of around one volt, and modern electronic memory devices typically operate at a voltage of less than two volts. Consequently, DC-to-DC converters are required in information technology equipment to convert high voltage to low voltage. Such DC-to-DC converters often must be capable of supporting large and varying loads while maintaining tight output voltage regulation. For example, a microprocessor may consume current ranging from several amperes to hundreds of amperes, depending on processing activity, and a DC-to-DC converter powering the microprocessor must be able to support this load current range while maintaining tight output voltage regulation. Additionally, current magnitude may change very quickly in many information technology equipment applications, and DC-to-DC converters must be capable of quickly responding to these load changes to minimize undesired output voltage excursions. A DC-to-DC converter's response to a fast load change may be referred to as the DC-to-DC converter's transient response. It is normally desirable that a DC-to-DC converter have a fast transient response to enable the DC-to-DC converter to quickly respond to load changes.

One type of DC-to-DC converter that can be used to convert high voltage to low voltage is a current doubling forward DC-to-DC converter. A current doubling forward DC-to-DC converter can be designed to support large current magnitude with relative ease, thereby making the converter practical for use in heavy load applications. Additionally, a current doubling forward DC-to-DC converter includes a transformer which can transform voltage magnitude, thereby enabling the converter to obtain large voltage magnitude transformation without requiring extreme switching duty cycles. Additionally, the transformer can facilitate achieving galvanic isolation in applications requiring such isolation. Inductors of a current doubling forward DC-to-DC converter can be either discrete inductors or coupled inductors. As known in the art, use of a coupled inductor in place of discrete inductors can improve DC-to-DC converter performance, reduce DC-to-DC converter size, and/or reduce DC-to-DC converter cost. Additionally, a combined transformer and coupled inductor can be used in place of a separate transformer and coupled inductor.

DETAILED DESCRIPTION OF THE EMBODIMENTS

Applicant has developed DC-to-DC converter controllers, current doubling forward DC-to-DC converters, and associated methods which significantly advance the state of the art. Certain embodiments of the DC-to-DC converter controllers are advantageously capable of generating phase control signals in manner which (a) balances magnitude of current processed among two phases of each power stage of a current doubling forward DC-to-DC converter and (b) balances magnitude of current processed among the power stages. Additionally, certain embodiments of the DC-to-DC converter controllers are capable of controlling a full-bridge switching stage and associated rectification switching devices from common phase control signals, thereby simplifying DC-to-DC converter design. Furthermore, certain embodiments of the DC-to-DC converter controllers are capable of controlling current doubling forward DC-to-DC converters in a manner that minimizes magnetic core direct current (DC), thereby potentially eliminating the need for primary side DC blocking capacitors. Additionally, the configuration of certain embodiments of the DC-to-DC converter controllers promotes low output voltage ripple magnitude while helping ensure reliable operation at low output voltage ripple magnitude. Moreover, certain embodiments of the DC-to-DC converter controllers are capable of quickly and reliably changing number of active power stages in response to a load change.

Figure 1:
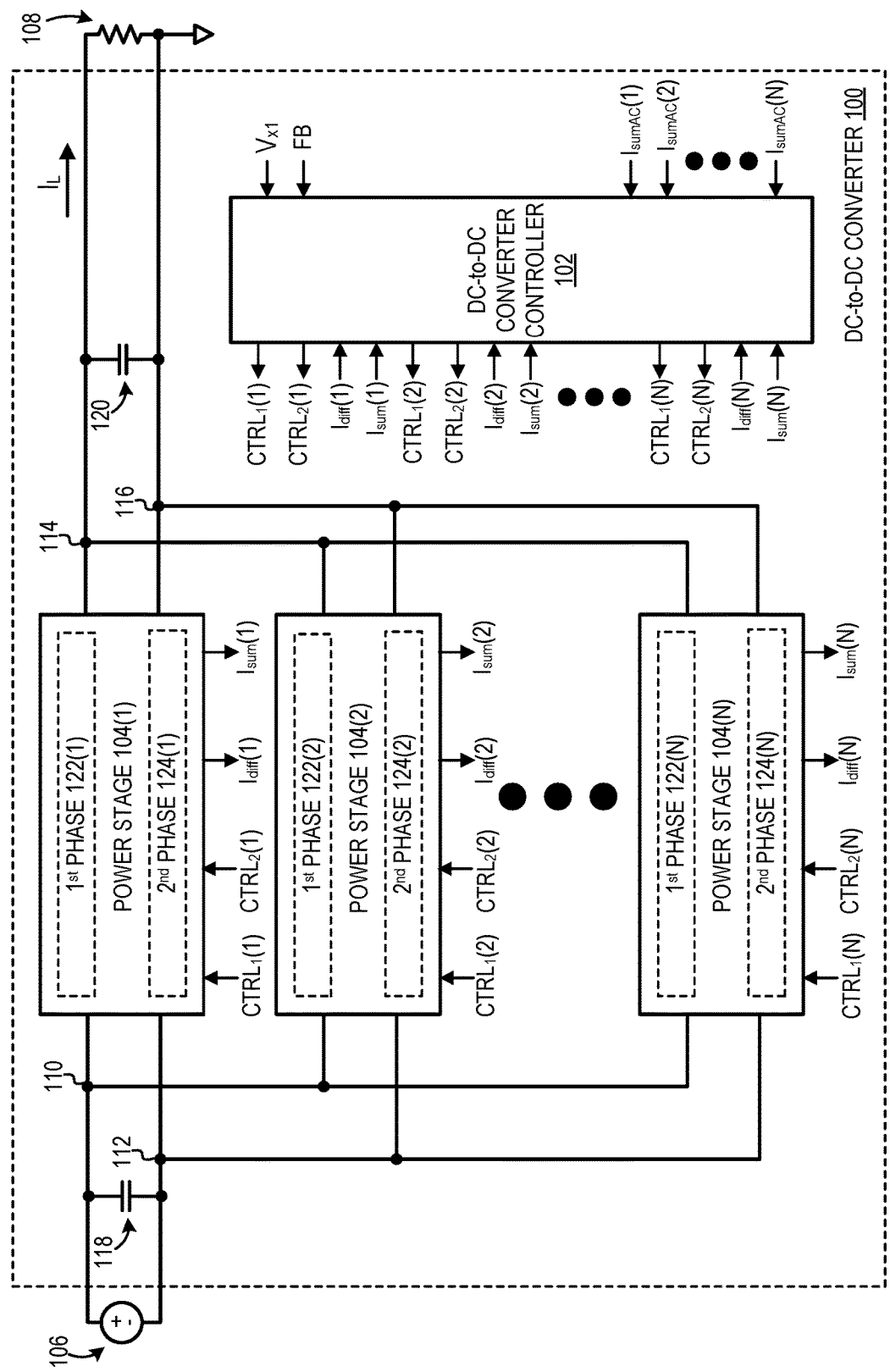
FIG. 1 illustrates a current doubling forward DC-to-DC converter, according to an embodiment.

FIG. 1 illustrates a current doubling forward DC-to-DC converter 100 including a DC-to-DC converter controller 102 and N power stages 104, where N is an integer greater than or equal to one. In this document, specific instances of an item may be referred to by use of a numeral in parentheses (e.g., power stage 104(1)) while numerals without parentheses refer to any such item (e.g., power stages 104). Power stages 104 are electrically coupled in parallel between an input electric power source 106 and a load 108. Each power stage 104 includes respective first and second power transfer paths or "phases" 122 and 124, and each power stage 104 is configured to transfer electric power from input electric power source 106 to load 108 at least partially under control of DC-to-DC converter controller 102, as discussed below. In certain embodiments, input electric power source 106 is a nominal 48 volt electric power source, although input electric power source 106 could have a lower or higher nominal voltage without departing from the scope hereof. Load 108 is, for example, a microprocessor, a memory subsystem, or a graphic processor.

Input electric power source 106 is electrically coupled between an input power node 110 and an input reference node 112, and each power stage 104 is also electrically coupled between input power node 110 and input reference node 112 to receive electric power from input electric power source 106. Load 108 is electrically coupled between an output power node 114 and an output reference node 116, and each power stage 104 is also electrically coupled between output power node 114 and output reference node 116 to deliver electric power to load 108. In some alternate embodiments where galvanic isolation is not required, each of input reference node 112 and output reference node 116 are joined into a common reference node. DC-to-DC converter 100 optionally further includes one or more input capacitors 118 and/or one or more output capacitors 120. Each input capacitor 118 is electrically coupled between input power node 110 and input reference node 112 to provide a source for alternating current (AC) drawn by power stages 104, and each output capacitor 120 is electrically coupled between output power node 114 and output reference node 116 to absorb ripple current generated by power stages 104.

DC-to-DC converter controller 102 is configured to control power stages 104 by generating a respective first phase control signal $CTRL_1$ and a respective second phase control signal $CTRL_2$ for each power stage 104, where the first phase control signal $CTRL_1$ controls the first phase 122 of the power stage, and the second phase control signal $CTRL_2$ controls the second phase 124 of the power stage. For example, DC-to-DC converter controller 102 is configured to generate first phase control signal $CTRL_1(1)$ and second phase control signal $CTRL_2(1)$ to control first phase 122(1) and second phase 124(1) of power stage 104(1), respectively. Each first phase 122 transfers electric power from input electric power source 106 to load 108 when its respective first phase control signal $CTRL_1$ is asserted, and each second phase 124 transfers electric power from input electric power source 106 to load 108 when its respective second phase control signal $CTRL_2$ is asserted. First and second phase control signals $CTRL_1$ and $CTRL_2$ are transmitted from DC-to-DC converter controller 102 to power stages 104 via one or more communication lines, which are not shown in FIG. 1 to promote illustrative clarity.

Each power stage 104 generates a respective current difference signal $I_{diff}$ and a respective current sum signal $I_{sum}$, which are used by DC-to-DC converter controller 102 to control DC-to-DC converter 100. Current difference signals $I_{diff}$ and current sum signals $I_{sum}$ are transmitted from power stages 104 to DC-to-DC converter controller 102 via one or more communication lines, which are not shown in FIG. 1 for illustrative clarity.

Figure 2:
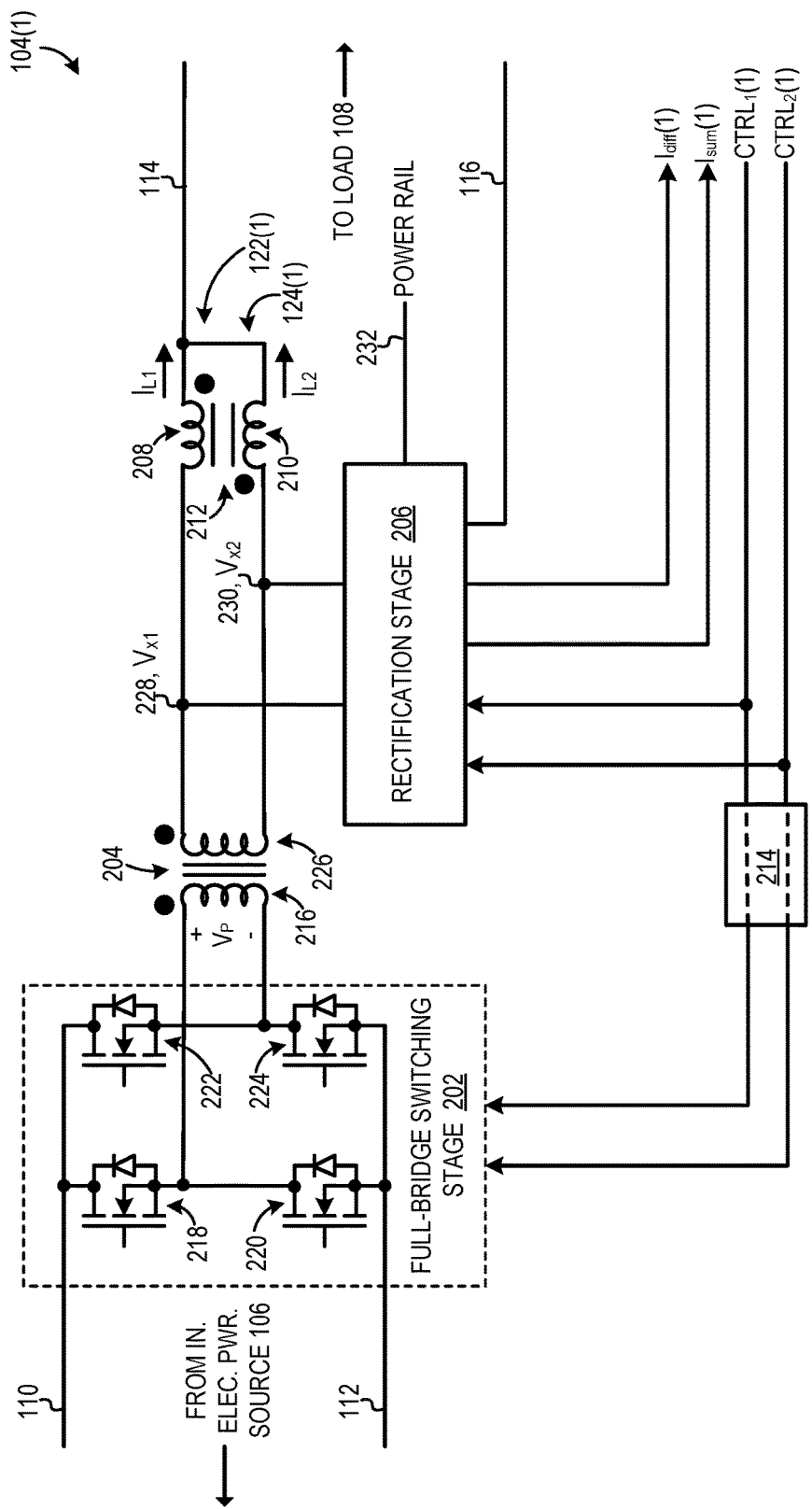
FIG. 2 illustrates one power stage of the FIG. 1 current doubling forward DC-to-DC converter.

FIG. 2 illustrates power stage 104(1). Each other power stage 104 of DC-to-DC converter 100 is like power stage 104(1). Power stage 104 includes a full-bridge switching stage 202, a transformer 204, a rectification stage 206, a first inductor 208, and a second inductor 210. First inductor 208 and second inductor 210 are magnetically coupled with each other and are part of a common coupled inductor 212. Rectification stage 206 generates current sum signal $I_{sum}(1)$ and current difference signal $I_{diff}(1)$, as discussed below. In embodiments, such as in embodiments for use where galvanic isolation is required, first and second phase control signals $CTRL_1(1)$ and $CTRL_2(1)$ are transmitted to full-bridge switching stage 202 via isolating communication device 214. Isolating communication device 214 is configured to transmit first and second phase control signals $CTRL_1(1)$ and $CTRL_2(1)$ to full-bridge switching stage 202 while maintaining galvanic isolation. In some embodiments, isolating communication device 214 is an optocoupler. However, the present Applicant has found that performance of current doubling forward DC-to-DC converter 100 can be significantly increased by implementing each of isolating communication device 214 with a digital isolator, such as the MAX14930F digital isolator from Maxim Integrated Products, Incorporated, instead of with an optocoupler. Such digital isolator is significantly faster than a conventional optocoupler, thereby enabling current doubling forward DC-to-DC converter 100 to have a larger control system bandwidth and associated faster transient response than would be possible if instead using optocouplers for isolating communication devices. Isolating communication device 214 is optionally omitted or replaced with non-isolated level-shifting circuitry in applications where galvanic isolation is not required. Isolating communication device 214 is either separate from power stage 104(1) or integrated with power stage 104(1).

Full-bridge switching stage 202 is electrically coupled between input electric power source 106 and a primary winding 216 of transformer 204. Full-bridge switching stage 202 includes four primary-side transistors 218, 220, 222, and 224 configured to switch at least partially under control of first and second phase control signals $CTRL_1(1)$ and $CTRL_2(1)$ from DC-to-DC converter controller 102 to generate an AC voltage having a period T across primary winding 216. In particular, in a first sub-period $T_{sp1}$ of period T corresponding to first phase control signal $CTRL_1(1)$ being asserted and second phase control signal $CTRL_2(1)$ being de-asserted, primary-side transistors 218 and 224 operate in their on states and primary-side transistors 220 and 222 operate in their off states. Consequently, full-bridge switching stage 202 applies a positive direct current (DC) voltage across primary winding 216 that is essentially equal in magnitude to voltage across input electric power source 106. In this document, a transistor is in its on state when the transistor is being controlled to be its conductive state, and a transistor is in its off state when the transistor is being controlled to be in its non-conductive state. For example, an n-channel enhancement MOSFET in its on state when a voltage above the transistor's threshold voltage is applied between the transistor's gate and source, and the transistor is in its off state when a voltage below the transistor's threshold voltage is applied between the transistor's gate and source. In a second sub-period $T_{sp2}$ of period T which immediately follows first sub-period $T_{sp1}$ and corresponds to each of first phase control signal $CTRL_1(1)$ and second phase control signal $CTRL_2(1)$ being de-asserted, each of primary-side transistors 218, 220, 222, and 224 operates in its off state, such that full-bridge switching stage 202 does not apply voltage across primary winding 216.

In a third sub-period $T_{sp3}$ of period T corresponding to first phase control signal $CTRL_1(1)$ being de-asserted and second control signal $CTRL_2(1)$ being asserted, primary-side transistors 218 and 224 operate in their off states, and primary-side transistors 220 and 222 operate in their on states. Consequently, full-bridge switching stage 202 applies a negative DC voltage across primary winding 216 that is essentially equal in magnitude and opposite in polarity to voltage across input electric power source 106. In a fourth sub-period $T_{sp4}$ of period T immediately following third sub-period $T_{sp3}$ and corresponding to each of first phase control signal $CTRL_1(1)$ and second phase control signal $CTRL_2(1)$ being de-asserted, each of primary-side transistors 218, 220, 222, and 224 operates in its off state, such that full-bridge switching stage 202 does not apply voltage across primary winding 216. First sub-period $T_{sp1}$, second sub-period $T_{sp2}$, third sub-period $T_{sp3}$, and fourth sub-period $T_{sp4}$ continuously repeat in sequence such that full-bridge switching stage 202 generates an AC voltage across primary winding 216.

Transformer 204 further includes a secondary winding 226 magnetically coupled with primary winding 216 such that the AC voltage across primary winding 216 is reflected across secondary winding 226. Although not required, it is anticipated that a ratio of number of turns of primary winding 216 to number of turns of secondary winding 226 will typically be greater than one such that magnitude of the AC voltage across secondary winding 226 is smaller than magnitude of the AC voltage across primary winding 216, to facilitate voltage magnitude transformation by DC-to-DC converter 100. A first terminal of secondary winding 226 is electrically coupled to a first terminal of first inductor 208 at a first switching node 228, and a second terminal of secondary winding 226 is electrically coupled to a first terminal of second inductor 210 at a second switching node 230. Respective second terminals of first inductor 208 and second inductor 210 are electrically coupled to output power node 114. Rectification stage 206 is electrically coupled to at least first switching node 228, second switching node 230, and output reference node 116. In some embodiments, rectification stage 206 is further electrically coupled to a power rail 232, as discussed below.

Figure 3:
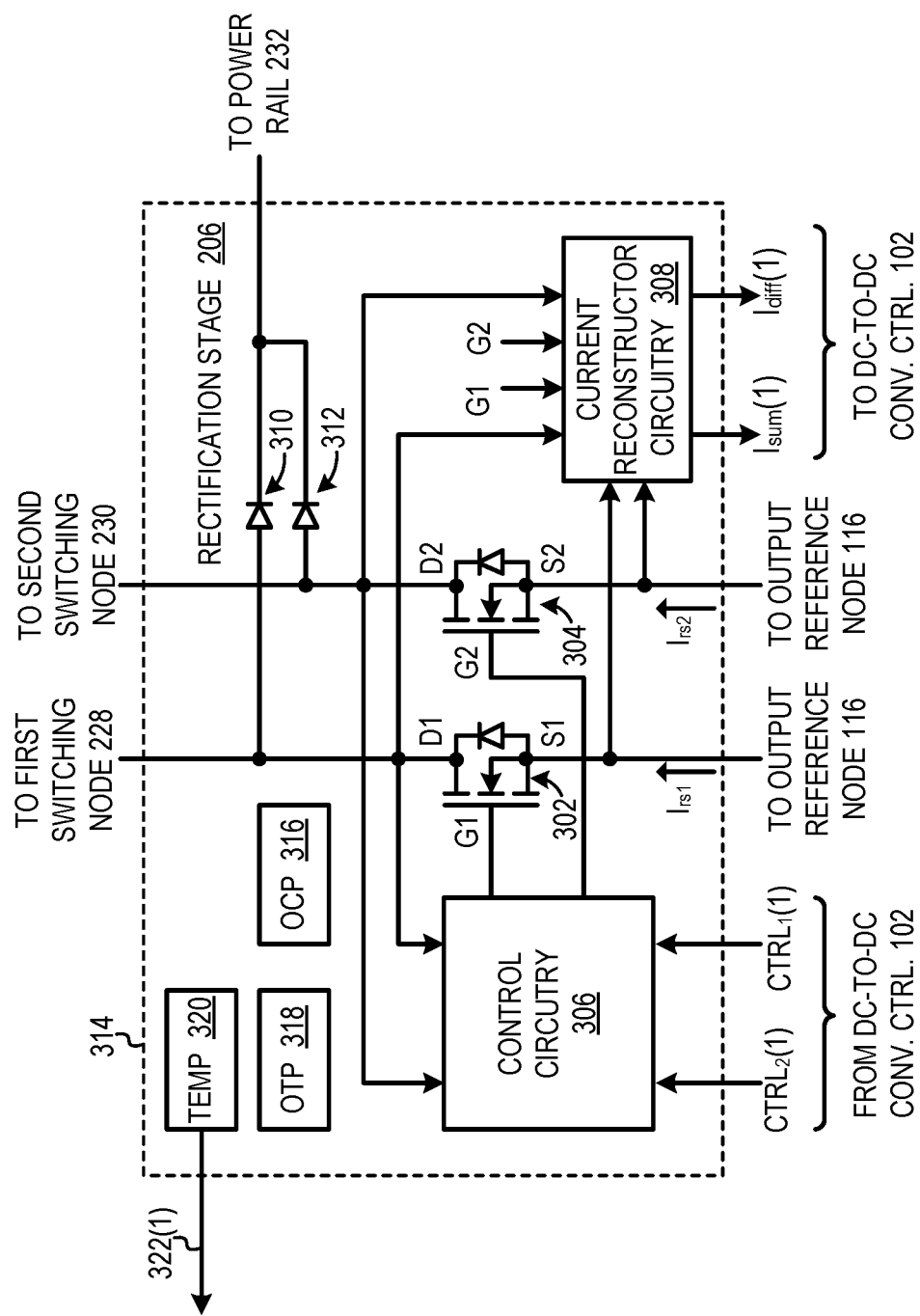
FIG. 3 illustrates a rectification stage of the FIG. 2 power stage.

FIG. 3 illustrates rectification stage 206 in further detail. Rectification stage 206 includes a first rectification switching device 302, a second rectification switching device 304, control circuitry 306, and current reconstructor circuitry 308. Rectification stage 206 optionally further includes one or more of (a) a first diode device 310 and a second diode device 312, (b) overcurrent protection (OCP) circuitry 316, (c) overtemperature protection (OTP) circuitry 318, and (d) temperature monitoring circuitry 320. In some embodiments, all components of rectification stage 206 are integrated in a common package, such as an integrated circuit package 314. However, rectification stage 206 could alternately be partially or completely formed of discrete components without departing from the scope hereof.

Each of first rectification switching device 302 and second rectification switching device 304 is, for example, an N-channel MOSFET as illustrated. However, one or more of first rectification switching device 302 and second rectification switching device 304 could be replaced with a different type of MOSFET, such as a p-channel MOSFET, or even a different type of transistor, such as a bipolar junction transistor, without departing from the scope hereof. First rectification switching device 302 is electrically coupled between first switching node 228 and output reference node 116, and second rectification switching device 304 is electrically coupled between second switching node 230 and output reference node 116. For example, in embodiments where first and second rectification switching devices 302 and 304 are N-channel MOSFETs, such as illustrated in FIG. 3, a drain D1 of first rectification switching device 302 is electrically coupled to first switching node 228, and a source S1 of first rectification switching device 302 is electrically coupled to output reference node 116. Similarly, in these embodiments, a drain D2 of second rectification switching device 304 is electrically coupled to second switching node 230, and a source S2 of second rectification switching device 304 is electrically coupled to output reference node 116. In some embodiments, each of first rectification switching device 302 and second rectification switching device 304 has a separate respective connection to output reference node 116, as illustrated in FIG. 3. In some other embodiments, first and second rectification switching devices 302 and 304 share a common connection to output reference node 116.

In each power stage 104, first phase 122 and second phase 124 have dedicated inductors and rectification switching devices, but the phases share other components of the power stage. For example, in power stage 104(1), full-bridge switching stage 202, transformer 204, first rectification switching device 302, and first inductor 208 collectively form first phase 122(1), and full-bridge switching stage 202, transformer 204, second rectification switching device 304, and second inductor 210 collectively form second phase 124(1).

Control circuitry 306 is configured to cause each of the first rectification switching device 302 and second rectification switching device 304 to switch between its on state and off state in response to first phase control signal $CTRL_1(1)$ and second phase control signal $CTRL_2(1)$, respectively. In particular, control circuitry 306 is configured to cause first rectification switching device 302 to operate in its on state when first phase control signal $CTRL_1(1)$ is de-asserted, and control circuitry 306 is configured to cause first rectification switching device 302 to operate in its off state when first phase control signal $CTRL_1(1)$ is asserted. Similarly, control circuitry 306 is configured to cause second rectification switching device 304 to operate in its on state when second control phase signal $CTRL_2(1)$ is de-asserted, and control circuitry 306 is configured to cause second rectification switching device 304 to operate in its off state when second phase control signal $CTRL_2(1)$ is asserted.

Current reconstructor circuitry 308 generates signals representing current flowing through first and second inductors 208 and 210. In particular, current reconstructor circuitry 308 is configured to generate current sum signal $I_{sum}(1)$ representing a sum of magnitude of current flowing through first and second inductors 208 and 210. Reconstructor circuitry 308 is further configured to generate current difference signal $I_{diff}(1)$ representing at least a difference between magnitude of current flowing through first inductor 208 and magnitude of current flowing through second inductor 210, as discussed below. DC-to-DC converter controller 102 uses current sum signal $I_{sum}(1)$ and current difference signal $I_{diff}(1)$ along with signals representing magnitude of voltage across at a switching node and voltage at output power node 114, for example, to generate first phase control signal $CTRL_1(1)$ and second phase control signal $CTRL_2(1)$. Voltage at output power node 114 is equivalent to an output voltage of DC-to-DC converter 100.

The present Applicant has determined that current flowing through first and second rectification switching devices 302 and 304 is representative of current flowing through first and second inductors 208 and 210 under certain conditions. In particular, a sum of current flowing through first and second rectification switching devices 302 and 304 represents a sum of current flowing through each of first and second inductors 208 and 210. Additionally, a difference between magnitude of current flowing through first rectification switching device 302 and magnitude of current flowing through second rectification switching device 304 when both rectification switching devices are simultaneously conducting current represents a difference between magnitude of current flowing through first inductor 208 and magnitude of current flowing through second inductor 210, along with magnetizing current of transformer 204. Accordingly, in the embodiment illustrated in FIG. 3, current reconstructor circuitry 308 is configured to generate current sum signal $I_{sum}(1)$ from a sum of magnitude of current flowing through first rectification switching device 302 and magnitude of current flowing through second rectification switching device 304. Additionally, in the FIG. 3 embodiment, current reconstructor circuitry 308 is configured to generate current difference signal $I_{diff}(1)$ from a difference between magnitude of current flowing through first rectification switching device 302 and magnitude of current flowing through second rectification switching device 304. In these embodiments, current difference signal $I_{diff}(1)$ can be expressed as follows when both first and second rectification switching devices 302 and 304 are simultaneously conducting current:

$$I_{diff}(1) = I_{L1} - I_{L2} + (2)(I_{mag}) \qquad \text{EQN. 1}$$

In EQN. 1 above, $I_{L1}$ represents magnitude of current flowing through first inductor 208, $I_{L2}$ represents magnitude of current flowing through second inductor 210, and $I_{mag}$ represents magnitude of magnetizing current of transformer 204.

In certain embodiments, current reconstructor circuitry 308 is further configured to generate current difference signal $I_{diff}(1)$ such that current difference signal $I_{diff}(1)$ represents a difference between magnitude of current flowing through first rectification switching device 302 and magnitude of current flowing through second rectification switching device 304 solely when current is simultaneously flowing through each of the first and second rectification switching devices. For example, in some embodiments, current reconstructor circuitry 308 is configured such that $I_{diff}(1)$ is zero when current is not simultaneously flowing through each of the first and second rectification switching devices 302 and 304. Such limitation on generation of current difference signal $I_{diff}(1)$ promotes small dynamic range of current difference signal $I_{diff}(1)$ without information loss because as discussed above, the difference in magnitude of current flowing through first and second rectification switching devices 302 and 304 represents the difference in magnitude of current flowing through first and second inductors 208 and 210 solely when both rectification switching devices are conducting current. Such small dynamic range of current difference signal $I_{diff}(1)$, in turn, may facilitate the control of the current difference signal by DC-to-DC converter controller 102. For example, in certain embodiments, DC-to-DC converter controller 102 is configured to operate DC-to-DC converter 100 such that an integral of current difference signal $I_{diff}(1)$ is zero. As can be appreciated from EQN. 1 above, minimizing an integral of current difference signal $I_{diff}(1)$ promotes equal magnitude of current through each of first and second inductors 208 and 210, as well as zero average magnitude of transformer 204 magnetizing current. The relatively small dynamic range of current difference signal $I_{diff}(1)$ minimizes time required for such integration, thereby simplifying DC-to-DC converter controller 102 design and promoting high performance.

In certain other embodiments, current reconstructor circuitry 308 is configured such that current difference signal $I_{diff}(1)$ remains at a constant non-zero value when current is not simultaneously flowing through each of the first and second rectification switching devices 302 and 304. Minimizing an integral of current difference signal $I_{diff}(1)$ in these embodiments promotes equal magnitude of current through each of first and second inductors 208 and 210, as well as zero average magnitude of transformer 204 magnetizing current. However, the non-zero value of difference signal $I_{diff}(1)$ while current is not simultaneously flowing through each of the first and second rectification switching devices 302 and 304 may increase integration time.

In some embodiments, current reconstructor circuitry 308 senses magnitude of current flowing through each of first rectification switching device 302 and second rectification switching device 304 using reference transistors electrically coupled to each of first rectification switching device 302 and second rectification switching device 304. Current through the reference transistors is combined and processed to generate current sum signal $I_{sum}(1)$ and current difference signal $I_{diff}(1)$. In these embodiments, the reference transistors have threshold voltages and current densities similar to those of first and second rectification switching devices 302 and 304 to help ensure accurate current reconstruction. It should be appreciated that such current sensing technique is "lossless," i.e., it generates current sum signal $I_{sum}(1)$ and current difference signal $I_{diff}(1)$ without use of current sense resistors electrically coupled in series with first rectification switching device 302 and second rectification switching device 304. Many conventional current sensing techniques, in contrast, require sense resistors electrically coupled in series with rectification switching devices, and these current sense resistors cause significant power loss at high current levels.

In some other embodiments, however, current reconstructor circuitry 308 senses magnitude of current flowing through each of first rectification switching device 302 and second rectification switching device 304 via a respective sense resistor electrically coupled in series with each rectification switching device. Voltages across the resistors are amplified and processed to generate current sum signal $I_{sum}(1)$ and current difference signal $I_{diff}(1)$. Current reconstructor circuitry 308 could alternately be configured to sense magnitude of current flowing through each of first rectification switching device 302 and second rectification switching device 304 in a different manner, however, without departing from the scope hereof.

Figure 4:
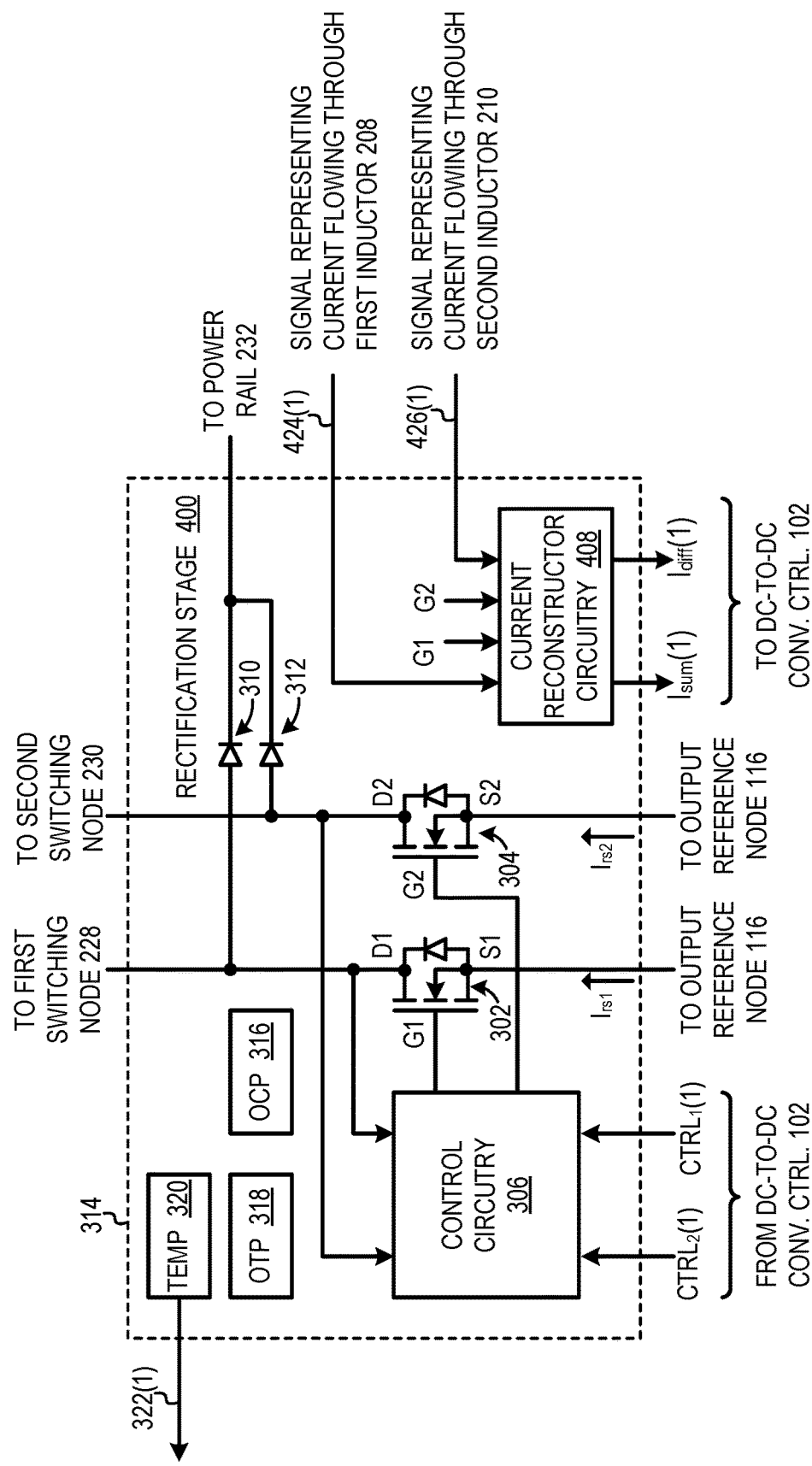
FIG. 4 illustrates an alternate embodiment of the rectification stage of the FIG. 2 power stage.

Additionally, rectification stage 206 could be modified to generate current sum signal $I_{sum}(1)$ and current difference signal $I_{diff}(1)$ from signals directly representing magnitude of current flowing through each of first and second inductors 208 and 210. For example, FIG. 4 illustrates a rectification stage 400 which is like rectification stage 206 of FIGS. 2 and 3, but with current reconstructor circuitry 308 replaced with current reconstructor circuitry 408. Current reconstructor circuitry 408 generates current difference signal $I_{diff}(1)$ from a difference between signals 424(1) and 426(1), where (a) signal 424(1) represents magnitude of current flowing through first inductor 208, and (b) signal 426(1) represents magnitude of current flowing through second inductor 210. Signals 424(1) and 424(2) are generated, for example, by sensing voltage drop across a current sense resistor electrically coupled in series with first and second inductors 208 and 210, respectively, or by sensing voltage drop across parasitic resistance of first and second inductors 208 and 210, respectively. In this alternate embodiment, current reconstructor circuitry 408 also generates current sum signal $I_{sum}(1)$ from a sum signals 424(1) and 424(2). Current reconstructor circuitry 408 could alternately be part of DC-to-DC converter controller 102 instead of rectification stage 400 without departing from the scope hereof.

A transistor cannot instantaneously switch between its on and off states. For example, in the case of a MOSFET, gate capacitance must be charged or discharged for the MOSFET to switch between its on and off states. Such charging and discharging of gate capacitance requires time, and therefore, the MOSFET cannot instantaneously switch between its on and off states. Accordingly, transistor switching time must be considered in DC-to-DC converter 100 to ensure efficient and reliable operation. For example, if first rectification switching device 302 switches from its off state to its on state immediately in response to first phase control signal $CTRL_1(1)$ changing from its asserted state to its de-asserted state, first rectification switching device 302 may operate in its on state before primary-side transistors 218 and 224 switch to their off states, resulting in a low-impedance path between input electric power source 106 and input reference node 112. Such low-impedance path may result in undesired current flow through DC-to-DC converter 100 referred to as "shoot-through," resulting in power loss, improper operation of DC-to-DC converter 100, and/or damage to DC-to-DC converter 100. Therefore, it is important to ensure that shoot-through does not occur.

Shoot-through can be avoided by delaying turn-on of each of first and second rectification switching devices 302 and 304 by a time delay period, referred to as "deadtime," that is sufficiently long to ensure that first and second rectification switching devices 302 and 304 are not turned on until corresponding primary-side transistors 218, 220, 222, and 224 are turned off. Excessive deadtime, however, may result in undesired transistor body diode conduction, which impairs DC-to-DC converter 100's efficiency.

Accordingly, Applicant has developed adaptive deadtime control which sets deadtime to a minimum value required to prevent significant shoot-through. For example, in certain embodiments, control circuitry 306 supports adaptive deadtime control by monitoring magnitude of voltage at each of first switching node 228 and second switching node 230 to help ensure that each of first rectification switching device 302 and second rectification switching device 304 is not turned on while transformer 204 is delivering power to its respective switching node, thereby preventing shoot-through while minimizing deadtime. In particular, control circuitry 306 is configured to cause first rectification switching device 302 to switch from its off state to its on state in response to (a) first phase control signal $CTRL_1(1)$ changing from its asserted state to its de-asserted state and (b) switching voltage $V_{x1}$ at first switching node 228, which is equal to voltage across first rectification switching device 302, being at (e.g., falling to) a first threshold value, such as 1 volt, which indicates that corresponding primary-side transistors 218 and 224 have at least substantially turned off. Similarly, control circuitry 306 is configured to cause second rectification switching device 304 to switch from its off state to its on state in response to (a) second phase control signal $CTRL_2(1)$ changing from its asserted state to its de-asserted state and (b) switching voltage $V_{x2}$ at second switching node 230, which is equal to voltage across second rectification switching device 304, being at (e.g., falling to) a second threshold value, such as 1 volt, which indicates that corresponding primary-side transistors 220 and 222 have at least substantially turned off. Consequently, control circuitry 306 in these embodiments minimizes deadtime to that required to prevent significant shoot-through, thereby promoting high efficiency while helping ensure reliable operation and longevity of DC-to-DC converter 100.

Additionally, in some embodiments, control circuitry 306 is further configured to cause each rectification switching device 302 and 304 to switch from its on state to its off state after its associated control phase signal $CTRL_1(1)$ or $CTRL_2(1)$ is asserted and a time delay period has expired, to further promote high efficiency by helping minimize transistor body diode conduction. In particular, in these embodiments, control circuitry 306 is configured to cause first rectification switching device 302 to switch from its on state to its off state in response to (a) first phase control signal $CTRL_1(1)$ changing from its de-asserted state to its asserted state and (b) expiration of a first time delay period, such as 5 nanoseconds. Similarly, control circuitry 306 is configured to cause second rectification switching device 304 to switch from its on state to its off state in response to (a) second phase control signal $CTRL_2(1)$ changing from its de-asserted state to its asserted state and (b) expiration of a second time delay period, such as 5 nanoseconds.

In certain embodiments, the first and second time delay periods are programmable. Additionally or alternatively, in some alternate embodiments, control circuitry 306 determines the first and second time delay periods at least partially according to operating conditions of DC-to-DC converter 100, to further reduce losses during switching. For example, in a particular embodiment, control circuitry 306 determines the first delay time period such that the first time delay period expires in response to voltage $V_{x1}$ being at (e.g., rising to) a third threshold value, such as 1 volt, to set the first time delay period to a minimum value required to prevent significant shoot-through. Furthermore, in this embodiment, control circuitry 306 determines the second delay time period such that the second time delay period expires in response to voltage $V_{x2}$ being at (e.g., rising to) a fourth threshold value, such as 1 volt, to set the second time delay period to a minimum value required to prevent significant shoot-through.

Determining deadtime within rectification stage 206, instead of in DC-to-DC converter controller 102, promotes improved performance of first rectification switching device 302 and second rectification switching device 304 by minimizing propagation delays between deadtime determination circuitry and the rectification switching devices. Additionally, determining deadtime within rectification stage 206 helps simplify DC-to-DC converter controller 102 design.

In embodiments including first and second diode devices 310 and 312, each of first diode device 310 and second diode device 312 electrically clamps its respective switching node 228 and 230 to power rail 232, thereby preventing voltage on first switching node 228 and voltage on second switching node 230 from exceeding voltage on power rail 232 by a significant amount. Such clamping of voltage on first and second switching nodes 228 and 230 helps prevent damage to first rectification switching device 302 and second rectification switching device 304, respectively, from transient voltage excursions caused by parasitic impedance of DC-to-DC converter 100, such as leakage inductance of transformer 204. Power rail 232 is, for example, part of power supply rail for powering components other than load 108. In some embodiments, power rail 232 is part of a 12 volt power rail for powering information technology equipment. The present Applicant has found that clamping transient voltage excursions to power rail 232 advantageously transfers energy associated with the transient voltage excursions to power rail 232 for use in powering components connected to the power rail, thereby promoting efficient energy use. Conversely, if energy associated with the transient voltage excursions was instead dissipated, such as in a resistive snubber or a zener diode, such energy would be lost, resulting in inefficient energy use. Magnitude of voltage on power rail 232 must be greater than magnitude of steady-state voltage expected on first and second switching nodes 228 and 230. Additionally, power rail 232 must be capable of sinking current from first and second diode devices 310 and 312.

Optional overcurrent protection circuitry 316 is configured to cause each of first and second rectification switching devices 302 and 304 to remain in its off state in response to magnitude of current through either of first or second rectification switching devices 302 and 304 exceeding a maximum current threshold value when conducting current in a direction flowing towards output reference node 116. Optional overtemperature protection circuitry 318 is configured to cause each of first and second rectification switching devices 302 and 304 to remain in its off state in response to temperature of rectification stage 206 exceeding a maximum temperature threshold value. Optional temperature monitoring circuitry 320 is configured to generate a temperature signal 322(1) representing temperature of rectification stage 206. Temperature signal 322(1) is, for example, an analog signal.

In some embodiments, temperature monitoring circuitry 320 is further configured to cause temperature signal 322(1) to have a value outside of its normal range of values in response to detection of a fault in rectification stage 206, such that temperature signal 322(1) can be used to signal DC-to-DC converter controller 102 and/or another device of the fault. For example, in particular embodiments, a common node is used for both temperature signal 322(1) and a digital fault signal. During normal operation, temperature signal 322(1) is generated at the node in analog form. In event of a fault, however, the node is repurposed and a digital fault signal is generated at the node, where the digital fault signal indicates, for example, occurrence of the fault and information about the fault.

It should be appreciated that full-bridge switching stage 202 and first rectification stage 206 are controlled by common phase control signals, i.e., first phase control signal $CTRL_1(1)$ and second phase control signal $CTRL_2(1)$. Such use of common phase control signals to control a full-bridge switching stage and a rectification stage of a given power stage 104 promotes ease of printed circuit board layout and low cost of current doubling forward DC-to-DC converter 100. Additionally, this use of common phase control signals promotes simplicity and reliability of DC-to-DC converter controller 102 by minimizing complexity of circuitry required therein.

Figure 5:
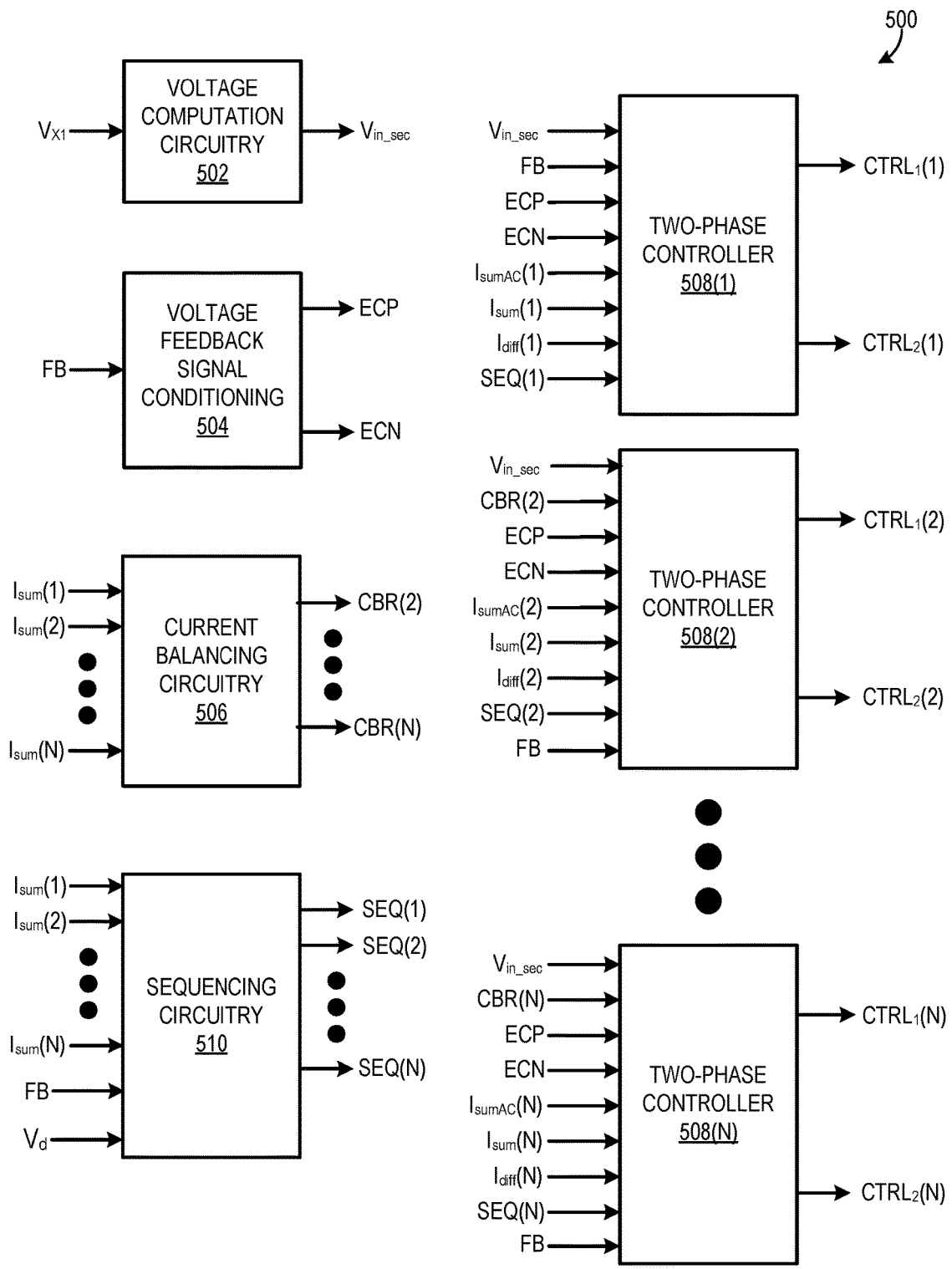
FIG. 5 illustrates one possible implementation of a DC-to-DC converter controller of the FIG. 1 current doubling forward DC-to-DC converter, according to an embodiment.

FIG. 5 illustrates a DC-to-DC converter controller 500, which is one possible implementation of DC-to-DC converter controller 102. It should be appreciated, however, that DC-to-DC converter controller 102 could be implemented in other manners without departing from the scope hereof, as long as DC-to-DC converter controller 102 is capable of generating phase control signals $CTRL_1$ and $CTRL_2$ based at least in part on one or more current sum signals $I_{sum}$ and one or more current difference signals $I_{diff}$ to (a) substantially balance magnitude of current through first and second inductors 208 and 210 and (b) substantially achieve zero average magnitude of transformer 204 magnetizing current.

DC-to-DC converter controller 500 of FIG. 5 receives at least the following signal inputs: (a) a respective current sum signal $I_{sum}$ and a respective current difference signal $I_{diff}$ from each power stage 104, (b) a respective signal $I_{sumAC}$ for each power stage 104, where each signal $I_{sumAC}$ includes AC components of current sum signal $I_{sum}$ of the power stage (c) a voltage feedback signal FB representing output voltage of current doubling forward DC-to-DC converter 100, i.e., voltage at output power node 114, and (d) a signal representing switching voltage $V_{x1}$ at first switching node 228. Each signal $I_{sumAC}$ is obtained, for example, by capacitively coupling AC components of the current sum signal $I_{sum}$ of it respective power stage 104 using capacitive coupling circuitry (not shown) external to DC-to-DC converter controller 500. In some alternate embodiments, however, signals $I_{sumAC}$ are generated within DC-to-DC converter controller 500 from current sum signals $I_{sum}$. In certain embodiments, DC-to-DC converter controller 500 additionally includes one or more power inputs (not shown) for connecting to an electric power source. DC-to-DC converter controller 500 further includes signal outputs for at least a respective first phase control signal $CTRL_1$ and a respective second phase control signal CTRL for each power stage 104. DC-to-DC converter controller 500 is not limited to the above-described inputs and outputs, and it is anticipated that many embodiments will include additional inputs and outputs, such as for telemetry, control, and/or monitoring purposes. For example, in a particular embodiment of DC-to-DC converter controller 500 intended for use in applications where load 108 includes a microprocessor, DC-to-DC converter controller 500 includes inputs and associated circuitry to receive a digital signal from the microprocessor specifying desired operating state, such as output voltage, of current doubling forward DC-to-DC converter 100.

DC-to-DC converter controller 500 includes voltage computation circuitry 502, voltage feedback signal conditioning circuitry 504, current balancing circuitry 506, a respective two-phase controller 508 for each power stage 104, and sequencing circuitry 510. Voltage computation circuitry 502 is configured to generate a secondary input voltage signal $V_{in\_sec}$ from a switching voltage at first switching node 228. Voltage computation circuitry 502 could be modified to sample voltage at a different switching node without departing from the scope hereof. Current doubling forward DC-to-DC converter 100 may need to operate for one or more pulses before voltage computation circuitry 502 is capable of generating secondary input voltage signal $V_{in\_sec}$ by sampling switching voltage $V_{x1}$ at first switching node 228. Therefore, in certain embodiments, voltage computation circuitry 502 is further to configured to set secondary input voltage signal $V_{in\_sec}$ to a predetermined or programmable default value at start-up of DC-to-DC converter controller 500, such as an estimated value of voltage at first switching node 228 under nominal conditions, and subsequently replace the default value with a value generated by sampling switching voltage $V_{x1}$. In some alternate embodiments, voltage computation circuitry 502 receives magnitude of input voltage from an external source, such as a system controller external to current doubling forward DC-to-DC converter 100, and voltage computation circuitry 502 generates secondary input voltage signal $V_{in\_sec}$ at least partially based on turns ratio of transformer 204 and information from this external source.

Voltage feedback signal conditioning circuitry 504 generates signals ECP and ECN at least based on voltage feedback signal FB. Target voltage signal ECP represents a desired output voltage of current doubling forward DC-to-DC converter 100, and voltage error signal ECN represents a difference between voltage feedback signal FB and target voltage signal ECP. In certain embodiments, the value of target voltage signal ECP is adjustable, such as by a digital or analog input (not shown) to DC-to-DC converter controller 500, to achieve a desired output voltage of current doubling forward DC-to-DC converter 100. In some other embodiments, however, the value of target voltage signal ECP is fixed. Additionally, voltage feedback signal conditioning circuitry 504 is optionally configured to adjust target voltage signal ECP to compensate for a voltage drop across a reference or ground power distribution bus of current doubling forward DC-to-DC converter 100. For example, assume that there is a 100 millivolt drop across the reference power distribution bus due to impedance of the power distribution bus. In certain embodiments voltage feedback signal conditioning circuitry 504 is configured to increase the value of target voltage signal ECP by 100 millivolts to compensate for the 100 millivolt drop.

Figure 6:
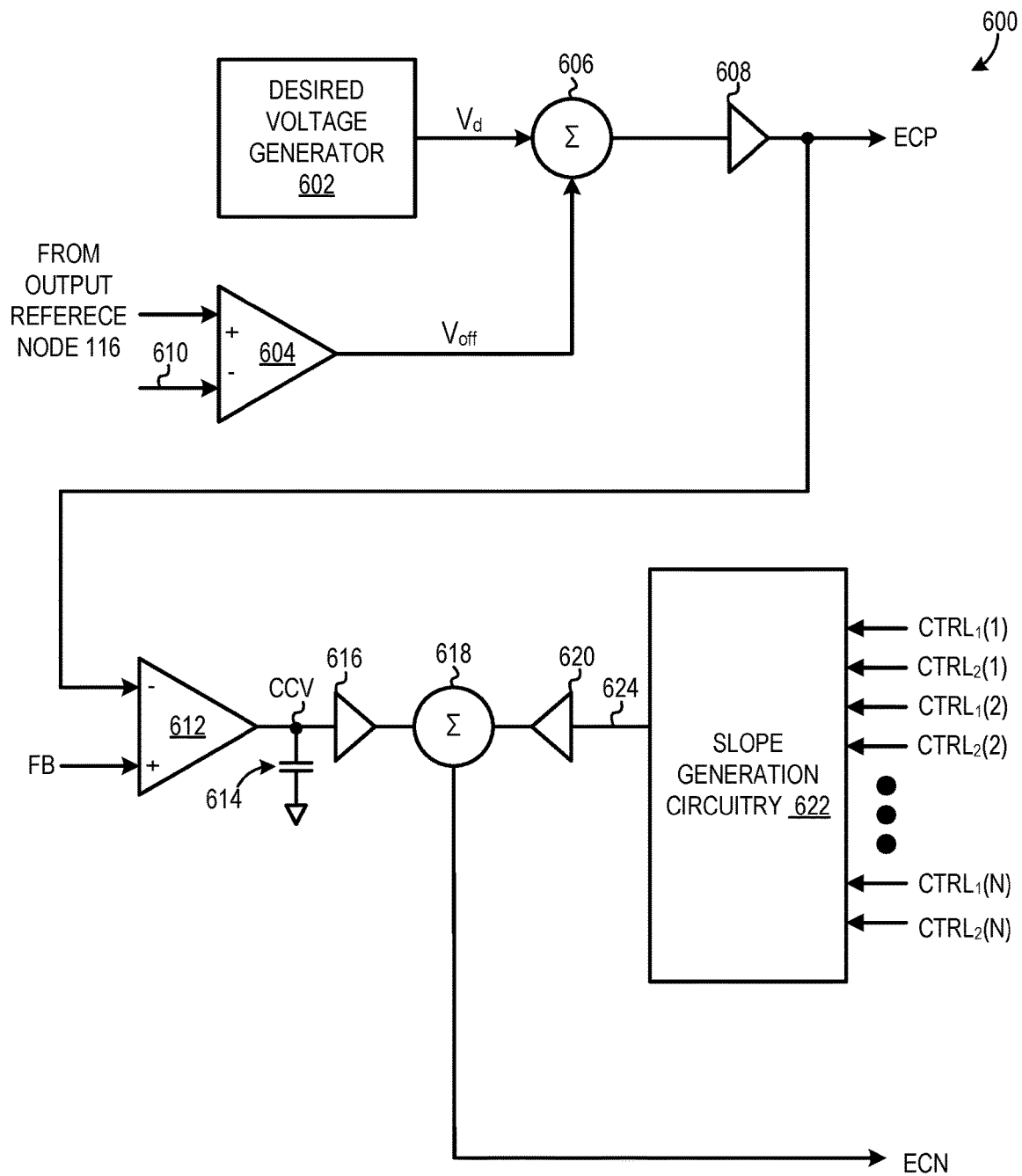
FIG. 6 illustrates one possible embodiment of voltage feedback signal conditioning circuitry of the FIG. 5 DC-to-DC converter controller.

FIG. 6 illustrates voltage feedback signal conditioning circuitry 600, which is one possible embodiment of voltage feedback signal conditioning circuitry 504 of FIG. 5. Voltage feedback signal conditioning circuitry 600 includes a desired voltage generator 602, a ground difference amplifier 604, a summation block 606, an optional buffer 608, a transconductance amplifier 612, a capacitor 614, an amplifier/attenuator 616, a summation block 618, an amplifier/attenuator 620, and slope generation circuitry 622. Desired voltage generator 602 generates a desired voltage $V_d$ representing a desired output voltage of current doubling forward DC-to-DC converter 100, and in some embodiments, the value of desired voltage $V_d$ is adjustable. Ground difference amplifier 604 amplifies a difference between voltage at output reference node 116 and a voltage at a reference node 610 at DC-to-DC converter controller 500, to generate an offset voltage $V_{off}$. In some embodiments, ground difference amplifier 604 has a gain of unity. Summation block 606 sums desired voltage $V_d$ and offset voltage $V_{off}$ to generate target voltage signal ECP. Optional buffer 608 buffers target voltage signal ECP. In some alternate embodiments where it is not necessary to adjust target voltage signal ECP to compensate for a voltage drop across a reference or ground power distribution bus, ground difference amplifier 604 and summation block 606 are omitted.

Transconductance amplifier 612 amplifies a difference between voltage feedback signal FB and target voltage signal ECP to generate an error current which is integrated by capacitor 614, thereby generating an error voltage CCV. Such integration of the error current helps achieve a high DC gain of an open loop response of DC-to-DC converter 100 and precise output voltage regulation of DC-to-DC converter 100. Amplifier/attenuator 616 buffers and modifies gain of error voltage CCV. Slope generation circuitry 622 generates a slope signal 624 whenever any phase control signals $CTRL_1$ or $CTRL_2$ to power stages 104 are asserted, and amplifier/attenuator 620 buffers and modifies gain of slope signal 624. Error voltage CCV and slope signal 624 are summed by summation block 618 to generate voltage error signal ECN. Inclusion of slope signal 624 in voltage error signal ECN promotes immunity to noise and reliable operation in applications where current doubling forward DC-to-DC converter 100 has low output ripple voltage magnitude. In some alternate embodiments, such as for use in applications where output ripple voltage magnitude is expected to be relatively large, slope generation circuitry 622, summation block 618, and amplifier/attenuator 620 are omitted and amplifier/attenuator 616 directly provides voltage error signal ECN.

DC-to-DC converter controller 102 implements two levels of current balancing. In the first level, which is discussed further below, each two-phase controller 508 instance balances magnitude of current processed among its first and second respective phases, i.e. each two-phase controller 508 instance balances magnitude of current flowing through first and second inductors 208 and 210, as well achieves zero average magnitude of transformer 204 magnetizing current. For example, two-phase controller 508(1) balances magnitude of current processed among its respective phases 122(1) and 124(1), or in other words, ensures that (a) magnitude of current flowing through each of first inductor 208 and second inductor 210 is substantially equal and (b) average magnitude of transformer 204 magnetizing current is substantially zero.

In the second level, two-phase controller instances 508(2) through 508(N) balance magnitude of current processed among power stages 104 using current balancing signals CBR generated by current balancing circuitry 506. Each current balancing signal CBR(x) represents a difference in magnitude of current processed by power stage 104(1) and a respective power stage 104(x), where x ranges from 2 to N. For example, current balancing signal CBR(2) represents a difference in magnitude of current processed by power stage 104(1) and power stage 104(2), current balancing signal CBR(3) represents a difference in magnitude of current processed by power stage 104(1) and power stage 104(3), and current balancing signal CBR(N) represents a difference in magnitude of current processed by power stage 104(1) and power stage 104(N). Each current balancing signal optionally also includes the value of voltage feedback signal FB, such as discussed below with respect to FIG. 7. It should be noted that it is not necessary to determine current balancing signal CBR(1) because such signal is necessarily zero, excluding the value of voltage feedback signal FB.

Figure 7:
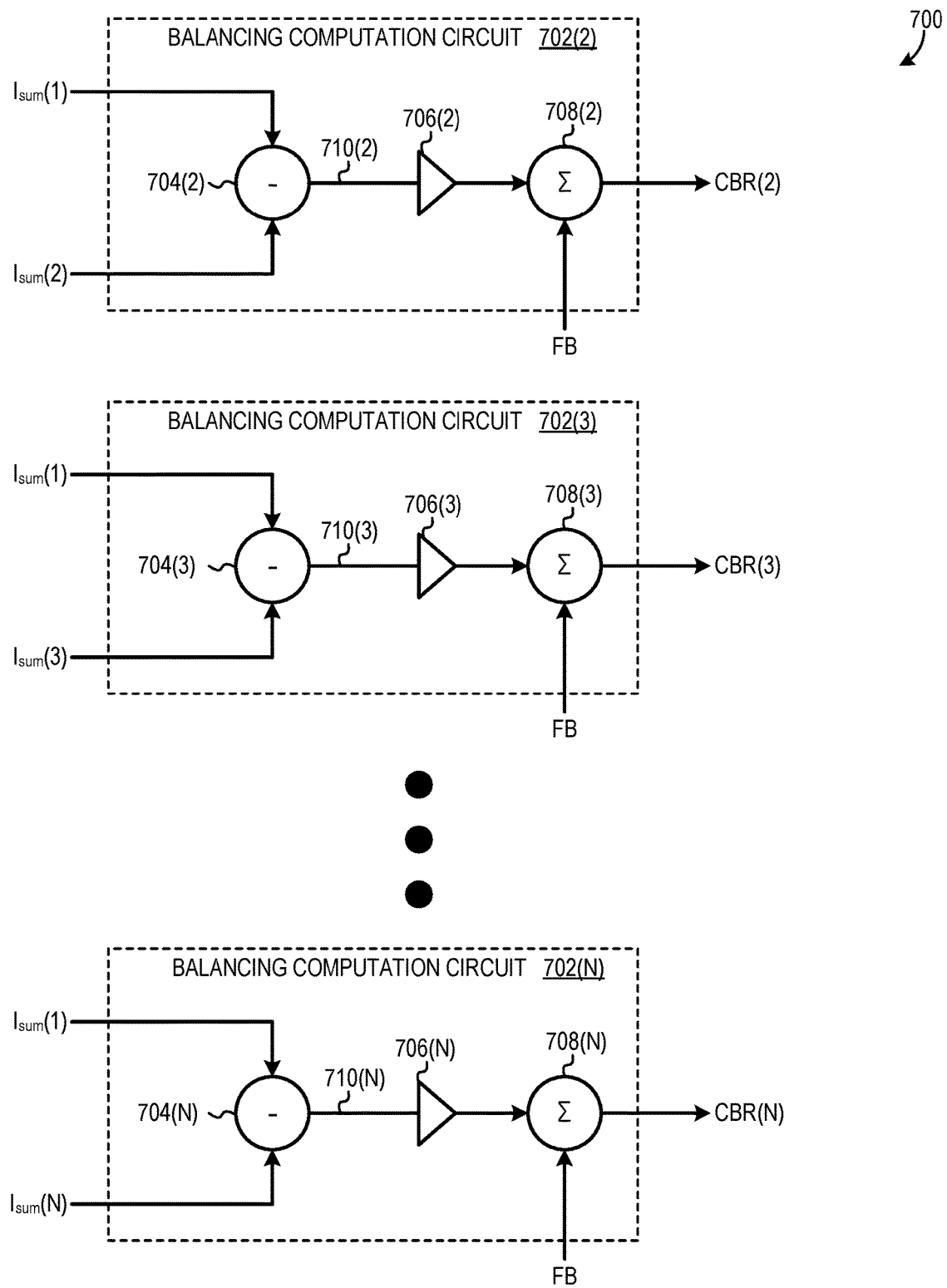
FIG. 7 illustrates one possible embodiment of current balancing circuitry of the FIG. 5 DC-to-DC converter controller.

FIG. 7 illustrates current balancing circuitry 700, which is one possible embodiment of current balancing circuitry 506 of FIG. 5. Current balancing circuitry 700 includes a respective balancing computation circuit 702 for each current balancing signal CBR. Each balancing computation circuit 702 includes a subtraction block 704, an amplifier/attenuator 706, and a summation block 708. Subtraction block 704 subtracts a respective current sum signal $I_{sum}$ from current sum signal $I_{sum}(1)$ to yield a respective difference signal 710, amplifier/attenuator 706 buffers and modifies gain of difference signal 710, and summation block 708 sums difference signal 710 and voltage feedback signal FB to yield a respective current balancing signal CBR. For example, in balancing computation circuitry 702(2), subtraction block 704(2) subtracts current sum signal $I_{sum}(2)$ from current sum signal $I_{sum}(1)$ to yield a difference signal 710(2), amplifier/attenuator 706(2) buffers and modifies gain of difference signal 710(2), and summation block 708(2) sums difference signal 710(2) and voltage feedback signal FB to yield a current balancing signal CBR(2).

Each of two-phase controllers 508(2) through 508(N) generates its respective first and second phase control signals $CTRL_1$ and $CTRL_2$ in a manner which minimizes its respective current balancing signal CBR, thereby balancing magnitude of current processed among power stages 104. For example, two-phase controller 508(2) generates first and second phase control signals $CTRL_1(2)$ and $CTRL_2(2)$ in manner which minimize current balancing signal CBR(1), thereby causing power stages 104(1) and 104(2) to process current having the same, or at least substantially the same, magnitude. As another example, two-phase controller 508(N) generates first and second phase control signals $CTRL_1(N)$ and $CTRL_2(N)$ in manner which minimizes current balancing signal CBR(N), thereby causing power stages 104(1) and 104(N) to process current having the same, or at least substantially the same, magnitude.

Figure 8:
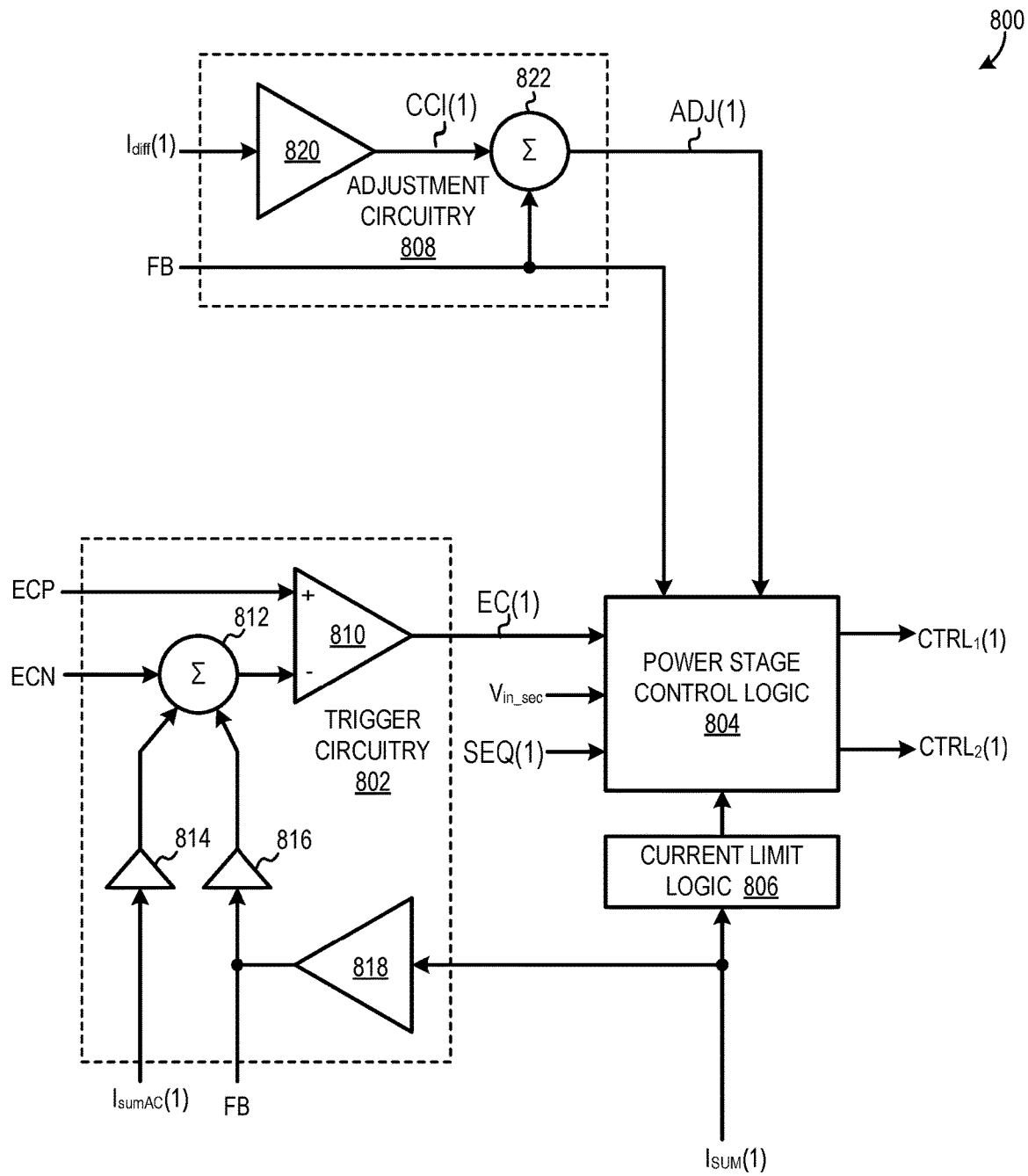
FIG. 8 illustrates one possible embodiment of a first instance of a two-phase controller of the FIG. 5 DC-to-DC converter controller.

FIG. 8 illustrates a two-phase controller 800, which is one possible embodiment of two-phase controller 508(1) of DC-to-DC converter controller 500. Two-phase controller 800 includes trigger circuitry 802, power stage control logic 804, current limit logic 806, and adjustment circuitry 808. Trigger circuitry 802 includes a comparator 810, a summation block 812, an amplifier/attenuator 814, an amplifier/attenuator 816, and an optional transconductance amplifier 818. Voltage feedback signal FB is applied to summation block 812 via amplifier/attenuator 816, signal $I_{sumAC}(1)$ is applied to summation block 812 via amplifier/attenuator 814, and voltage error signal ECN is directly applied to summation block 812. An output of summation block 812 into is applied to the inverting input of comparator 810, and target voltage signal ECP is applied to a non-inverting input of comparator 810. Consequently, comparator 810 compares a sum of (a) signal $I_{sum1AC}(1)$, (b) voltage feedback signal FB, and (c) voltage error signal ECN to target voltage signal ECP. Comparator 810 asserts its output, i.e., a trigger signal EC(1), in response to the value of the sum falling below target voltage signal ECP. Applying amplified current sum signal $I_{sumAC}(1)$ into the inverting input of comparator 810 further promotes immunity to noise and reliable operation in applications where current doubling forward DC-to-DC converter 100 has low output ripple voltage magnitude.

Optional transconductance amplifier 818 injects a current signal proportional to current sum signal $I_{sum}(1)$ onto the node of voltage feedback signal FB. Such current injection is used, for example, to help establish a non-zero effective output impedance of DC-to-DC converter 100 such that output voltage decreases in proportion to magnitude of load current $I_L$. For example, in some embodiments, voltage feedback signal FB is sampled from output power node 114 via a resistor, and current injected into the node of voltage feedback signal FB via transconductance amplifier 818 of each two-phase controller 508 creates a voltage across the resistor that is proportional to the sum of all current sum signals $I_{sum}$, thereby causing output voltage of DC-to-DC converter 100 to decrease in proportion to magnitude of load current $I_L$.

Adjustment circuitry 808 includes an amplifier/attenuator 820 and a summation block 822. Amplifier/attenuator 820 integrates current difference signal $I_{diff}(1)$ to generate signal CCI(1), and summation block 722 sums signal CCI(1) with voltage feedback signal FB to generate adjustment signal ADJ(1). In certain embodiments, amplifier/attenuator 820 is programmable, such as to achieve a desired frequency response.

Power stage control logic 804 causes each of first and second phase control signals $CTRL_1(1)$ and $CTRL_2(1)$ to remain in its de-asserted state while signal SEQ(1) from sequencing circuitry 510 is de-asserted. Upon assertion of signal SEQ(1), power stage control logic 804 causes first phase control signal $CTRL_1(1)$ to switch from its de-asserted state to its asserted state in response to a first assertion of trigger signal EC(1), and power stage control logic 804 causes second phase control signal $CTRL_2(1)$ to switch from its de-asserted state to its asserted state in response to a second assertion of trigger signal EC(1). Thus, two-phase controller 800 generates first and second phase control signals $CTRL_1(1)$ and $CTRL_2(1)$ out-of-phase with respect to each other upon assertion of signal SEQ(1). A phase 122 or 124 is "fired" by switching its respective phase control signal $CTRL_1(1)$ or $CTRL_2(1)$ from its de-asserted state to its asserted state. For example, power stage control logic 804 fires first phase 122(1) by causing first phase control signal $CTRL_1(1)$ to switch from its de-asserted state to its asserted state, and power stage control logic 804 fires second phase 124(1) by causing second phase control signal $CTRL_2(1)$ to switch from its de-asserted state to its asserted state. Accordingly, two-phase controller 800 is configured to cause first and second phases 122(1) and 124(1) to fire in an alternating manner, i.e., first phase 122(1) is fired and then second phase 124(1) is fired, upon assertion of signal SEQ(1).

Power stage control logic 804 is configured to control assertion duration of first phase control signal $CTRL_1(1)$ in proportion to voltage feedback signal FB and in inverse proportion to secondary input voltage signal $V_{in\_sec}$ to regulate magnitude of DC-to-DC converter 100 output voltage. For example, an increase in output voltage of current doubling forward DC-to-DC converter 100 causes first phase control signal $CTRL_1(1)$ to be asserted for a longer duration, while increase in secondary input voltage signal $V_{in\_sec}$ causes first phase control signal $CTRL_1(1)$ to be asserted for a shorter duration.

Power stage control logic 804 is further configured to control assertion duration of second phase control signal $CTRL_2(1)$ in proportion to adjustment signal ADJ(1) and in inverse proportion to secondary input voltage signal $V_{in\_sec}$. As discussed above, adjustment signal ADJ(1) is equal to the sum of the integral of current difference signal $I_{diff}(1)$ and voltage feedback signal FB. Consequently, power stage control logic 804 increases duration of second phase control signal $CTRL_2(1)$ in proportion to the integral of current difference signal $I_{diff}(1)$, to balance magnitude of current in first and second inductors 208 and 210 and to achieve zero average magnitude of transformer 204 magnetizing current. Thus, magnetic flux balancing in transformer 204 is potentially achieved without a DC blocking capacitor in series with primary winding 216. Additionally, power stage control logic 804 controls duration of second phase control signal $CTRL_2(1)$ in proportion to voltage feedback signal FB and in inverse proportion to secondary input voltage signal $V_{in\_sec}$ to regulate magnitude of DC-to-DC converter 100 output voltage. It is anticipated that duration of first phase control signal $CTRL_1(1)$ and duration of second phase control signal $CTRL_2(1)$ will be about the same under typical steady-state operating conditions.

Power stage control logic 804 is also optionally configured to ensure that each of first phase control signal $CTRL_1(1)$ and second phase control signal $CTRL_1(2)$ is de-asserted for at least a minimum time period. Current limit logic 806 cooperates with power stage control logic 804 to prevent first phase control signal $CTRL_1(1)$ or second phase control signal $CTRL_1(2)$ from being asserted if current sum signal $I_{sum}(1)$ exceeds a predetermined threshold, thereby implementing current limiting.

Figure 9:
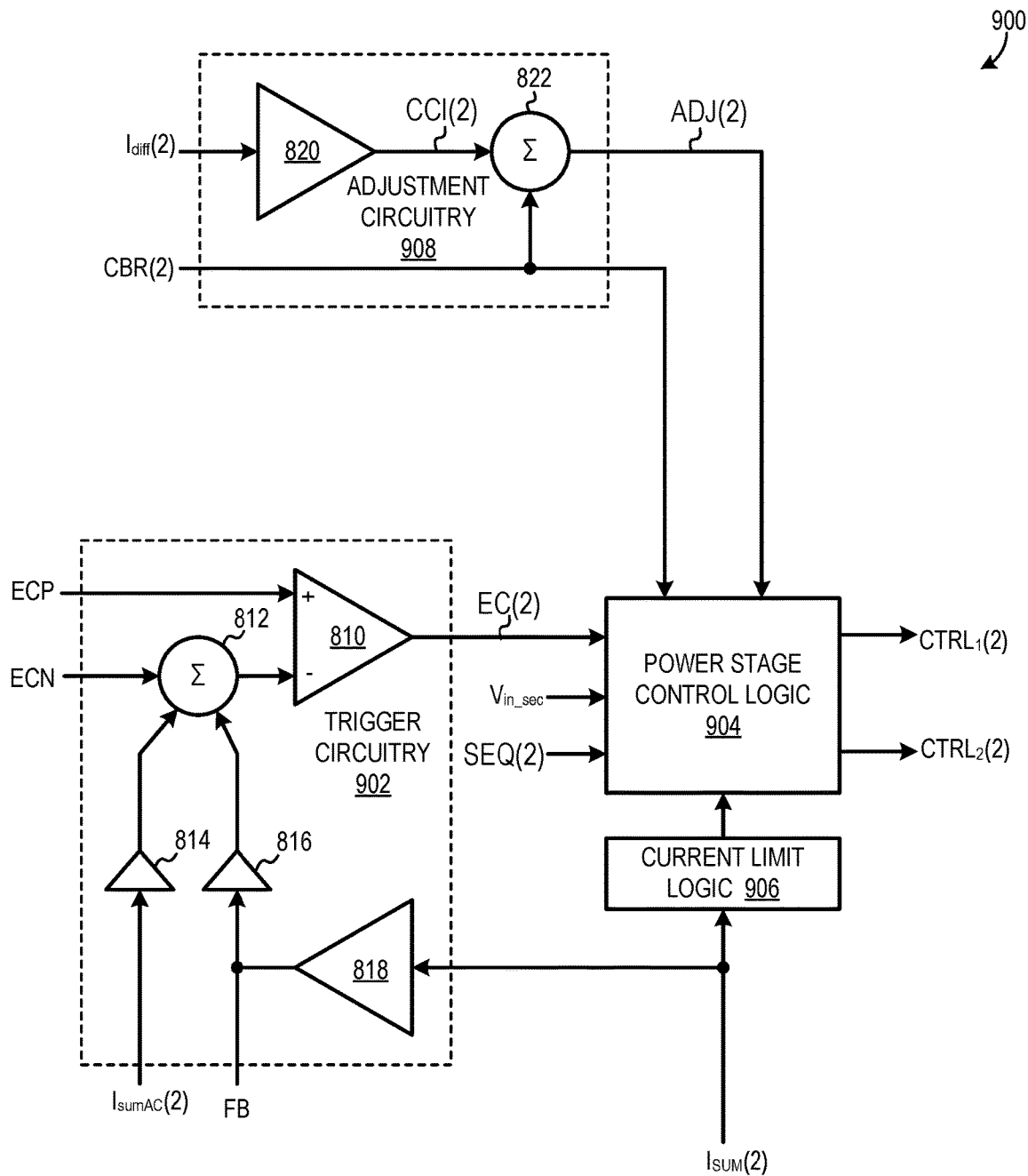
FIG. 9 illustrates one possible embodiment of a second instance of a two-phase controller of the FIG. 5 DC-to-DC converter controller.

FIG. 9 illustrates two-phase controller 900, which is one possible embodiment of two-phase controller 508(2) of DC-to-DC converter controller 500. In certain embodiments, each remaining two-phase controller 508(3) through 508(N) is like two-phase controller 900. Two-phase controller 900 includes trigger circuitry 902, power stage control logic 904, current limit logic 906, and adjustment circuitry 908. Trigger circuitry 902 and current limit logic 906 are analogous to trigger circuitry 802 and current limit logic 806, respectively, of two-phase controller circuitry 800 of FIG. 8. Adjustment circuitry 908 is like adjustment circuitry 808 except that current balancing signal CBR(2) is applied into summing block 824 in place of voltage feedback signal FB. Consequentially, adjustment circuitry 908 generates adjustment signal ADJ(2) representing (a) a difference in magnitude of current processed by first phase 122(2) and second phase 124(2) of power stage 104(2), (b) a difference in magnitude of current processed by power stage 104(1) and power stage 104(2), and (c) voltage feedback signal FB. Power stage control logic 904 controls assertion duration of second phase control signal $CTRL_2(2)$ so that signal ADJ(2) is zero, thereby balancing magnitude of current processed among phases 122(2) and 124(2) of power stage 104(2), as well as balancing magnitude of current processed among power stages 104(1) and 104(2).

Power stage control logic 904 is configured to control assertion duration of first phase control signal $CTRL_2(1)$ in proportion to current balancing signal CBR(2) and in inverse proportion to secondary input voltage signal $V_{in\_sec}$ to regulate magnitude of DC-to-DC converter 100 output voltage and to balance magnitude of current processed among power stages 104(1) and 104(2). Power stage control logic 904 is further configured to control assertion duration of second phase control signal $CTRL_2(1)$ in proportion to adjustment signal ADJ(2) and in inverse proportion to secondary input voltage signal $V_{in\_sec}$ to (a) balance magnitude of current processed among phases of second power stage 104(2) and to achieve zero average magnitude of the transformer magnetizing current of power stage 104(2), (b) balance magnitude of current processed among power stages 104(1) and 104(2), and (c) regulate magnitude of DC-to-DC converter 100 output voltage. It is anticipated that duration of phase control signals $CTRL_1(2)$ and $CTRL_2(2)$ will be about the same as duration of phase control signals $CTRL_1(1)$ and $CTRL_2(1)$, respectively, under typical steady-state operating conditions.

Sequencing circuitry 510 (FIG. 5) is configured to generate a respective signal SEQ for each two-phase controller 508, and sequencing circuitry 510 is further configured to assert signals SEQ in a rotating manner. For example, in one embodiment where N is equal to three, sequencing circuitry 510 is configured to asserts signals SEQ in the following rotating manner: SEQ(1) is asserted, SEQ(2) is asserted, SEQ(3) is asserted, SEQ(1) is asserted, and so on. Each power stage 104 is fired upon assertion of its respective signal SEQ. Thus, sequencing circuitry 510 causes power stages 104 to fire in a rotating manner. Each power stage 104 causes its respective phases 122 and 124 to fire in an alternating manner upon the power stage being fired by assertion of its respective signal SEQ.

In certain embodiments, sequencing circuitry 510 is further configured to change number of active power stages 104 depending on magnitude of load current $I_L$. In particular, as magnitude of load current $I_L$ drops, sequencing circuitry 510 is configured to decrease the number of active power stages 104, and as magnitude of load current $I_L$ increases, sequencing circuitry 510 is configured to increase the number of active power stages 104, in these embodiments. Disabling and enabling power stages 104 and associated phases 122 and 124 are sometimes referred to as "phase shedding" and "phase adding," respectively. Phase shedding and phase adding promote high efficiency by tuning the number of active power stages 104 to that required to adequately support magnitude of load current $I_L$, thereby helping minimize losses associated with operation of unneeded power stages 104 under light load conditions. Sequencing circuitry 510 disables a particular power stage 104, for example, by discontinuing assertion of its respective signal SEQ when asserting signals SEQ in a rotating manner, and sequencing circuitry 510 enables a particular power stage 104, for example, by resuming assertion of its respective signal SEQ when asserting signals SEQ in a rotating manner.

In a certain embodiments, sequencing circuitry 510 is configured to disable one or more power stages 104 in response to magnitude of load current $I_L$ being at (e.g., dropping below) a phase-shedding current threshold value. For instance, in particular embodiments, sequencing circuitry 510 sums all current sum signals $I_{sum}$ to generate a signal $I_{sum\_t}$ representing load current $I_L$ magnitude, and a filtered signal $I_{sum\_t}$ is compared to a phase-shedding current threshold value. One or more power stages 104 are disabled in response to filtered signal $I_{sum\_t}$ being at (e.g., dropping below) the phase-shedding current threshold value. Additionally, in some embodiments, filtered signal $I_{sum\_t}$ is compared to multiple phase-shedding current threshold values, and a respective number of power stages 104 are disabled in response to filtered signal $I_{sum\_t}$ being at (e.g., dropping below) each phase shedding current threshold value. Furthermore, in some embodiments, sequencing circuitry 510 is further configured to deactivate all but one power stage 104 and cause the one activated power stage 104 to stop switching for one or more switching cycles, referred to as a skip mode operation, in response to filtered signal $I_{sum\_t}$ being at (e.g., dropping below) a skip mode threshold value. While not required, the skip mode threshold value typically corresponds to a very small magnitude of load current $I_L$, to promote high efficiency under very light load conditions.

For example, in a particular embodiment, N is equal to four such that there are four power stages 104, and filtered signal $I_{sum\_t}$ is compared to the following phase-shedding current threshold values: 150 amperes, 100 amperes, and 50 amperes. Assume that all four power stages 104(1)-104(4) are initially activated. In response to load current $I_L$ (represented by filtered signal $I_{sum\_t}$) magnitude being at (e.g., dropping below) 150 amperes, power stage 104(4) is disabled, and in response to load current $I_L$ magnitude being at (e.g., dropping below) 100 amperes, power stages 104(3) and 104(4) are disabled. In response to load current $I_L$ magnitude being (e.g., dropping below) 50 amperes, power stages 104(2)-104(4) are disabled, so that only power stage 104(1) is enabled. Large load current $I_L$ magnitude decreases, such as a decrease from 175 amperes to 25 amperes, will result in several power stages 104 being deactivated in a single step, thereby eliminating the need to step through multiple phase shedding steps in response to a large load decrease, which promotes fast phase shedding. The number of phase-shedding current threshold values, as well as the magnitude of each phase-shedding current threshold value, could vary without departing from the scope hereof.

Additionally, in some embodiments, sequencing circuitry 510 is configured to enable one or more power stages 104 in response to a difference between a desired output voltage of DC-to-DC converter 100 and an actual output voltage of DC-to-DC converter 100 being at (e.g., rising above) a phase-adding voltage threshold value. Difference between desired output voltage and actual output represents load current $I_L$ magnitude under steady-state conditions in embodiments where DC-to-DC converter 100 has a non-zero effective output impedance and is operating under steady-state, or quasi-steady-state, conditions. DC-to-DC converter 100 is optionally configured to intentionally have a non-zero effective output impedance, for example, to achieve a desired relationship between output voltage magnitude and output current magnitude, sometimes referred to as a controlled "load line," where output voltage magnitude drops with increasing output current magnitude. Applicant has found that enabling power stages 104 according to a difference between desired output voltage and actual output voltage advantageous achieves fast power stage 104 activation in response to a load magnitude increase. In particular, actual output voltage changes quickly in response to a load magnitude change in these embodiments, and therefore, difference between desired output voltage and actual output voltage will quickly increase in response to a load magnitude change. Fast power stage 104 activation in response to a load magnitude increase is desirable because its helps prevent currently active power stages 104 from being overloaded in response to the load magnitude increase, thereby promoting high efficiency even during periodic transient load conditions, power stage 104 longevity, and fast DC-to-DC converter 100 transient response. In contrast, in conventional systems, power stages/phases are typically added in response to an increase in inductor current magnitude, and inductor current magnitude increases relatively slowly in response to a load magnitude current increase, due to limited control system bandwidth and limited slew-rate of inductor current. Consequently, conventional phase adding techniques typically respond relatively slowly to an increase in load current magnitude.

In some embodiments, sequencing circuitry 510 determines a difference $\Delta V$ between desired output voltage $V_d$ and actual output voltage (i.e., voltage at output power node 114) and compares difference $\Delta V$ to a phase-adding voltage threshold value. One or more power stages 104 are enabled in response to difference $\Delta V$ being at (e.g., rising above) the phase-adding voltage threshold value. Additionally, in some embodiments, difference $\Delta V$ is compared to multiple phase-adding voltage threshold values, and a respective number of power stages 104 are enabled in response to difference $\Delta V$ being at (e.g., rising above) each phase-adding voltage threshold value.

For example, consider a particular embodiment of DC-to-DC converter 100 where (a) effective output impedance is intentionally configured to be 1 milliohm, (b) N is equal to four such that there are four power stages 104, and (c) difference $\Delta V$ is compared to the following phase-adding voltage threshold values to trigger phase-adding: 0.025 volts (corresponding to $I_L$ being 25 amperes), 0.050 volts (corresponding to $I_L$ being 50 amperes), and 0.075 volts (corresponding to $I_L$ being 75 amperes). Assume that difference $\Delta V$ is initially less than 0.025 volts so that only power stage 104(1) is enabled. In response to difference $\Delta V$ being at (e.g., rising above) 0.025 volts, power stages 104(1) and 104(2) are enabled, and in response to difference $\Delta V$ being at (e.g., rising above) 0.05 volts, power stages 104(1)-104(3) are enabled. In response to difference $\Delta V$ being at (e.g., rising above) 0.075 volts, power stages 104(1)-104(4) are enabled, so that all power stages 104 are enabled. Large load current $I_L$ magnitude increase, such as an increase from 15 amperes to 175 amperes, will result in several power stages 104 being activated in a single step, thereby eliminating the need to step through multiple phase adding steps in response to a large load current magnitude increase, thereby promoting fast phase adding. The number of phase-adding voltage threshold values, as well as the magnitude of each phase-adding voltage threshold value, could vary without departing from the scope hereof.

In embodiments where DC-to-DC converter 100 has a relatively low output impedance, such as where DC-to-DC converter 100 is not configured to have a controlled load line, output voltage may not significantly change in response to an increase in load current $I_L$ magnitude in some cases, such as when load current $I_L$ magnitude slowly changes. Therefore, in some embodiments, one or more power stages 104 are activated in response to either one of the following two events, to help ensure that power stages 104 are quickly activated in response to an increase in magnitude of load current $I_L$: (a) difference $\Delta V$ being at (e.g., rising above) a phase-adding voltage threshold value, as discussed above, or (b) output current $I_L$ magnitude being at (e.g., rising above) a phase-adding current threshold value. In some embodiments, output current $I_L$ magnitude is compared to multiple phase-adding current threshold values, and a respective number of power stages 104 are enabled in response to load current $I_L$ magnitude being at (e.g., rising above) each phase-adding current threshold value, to determine occurrence of event (b).

Figure 16:
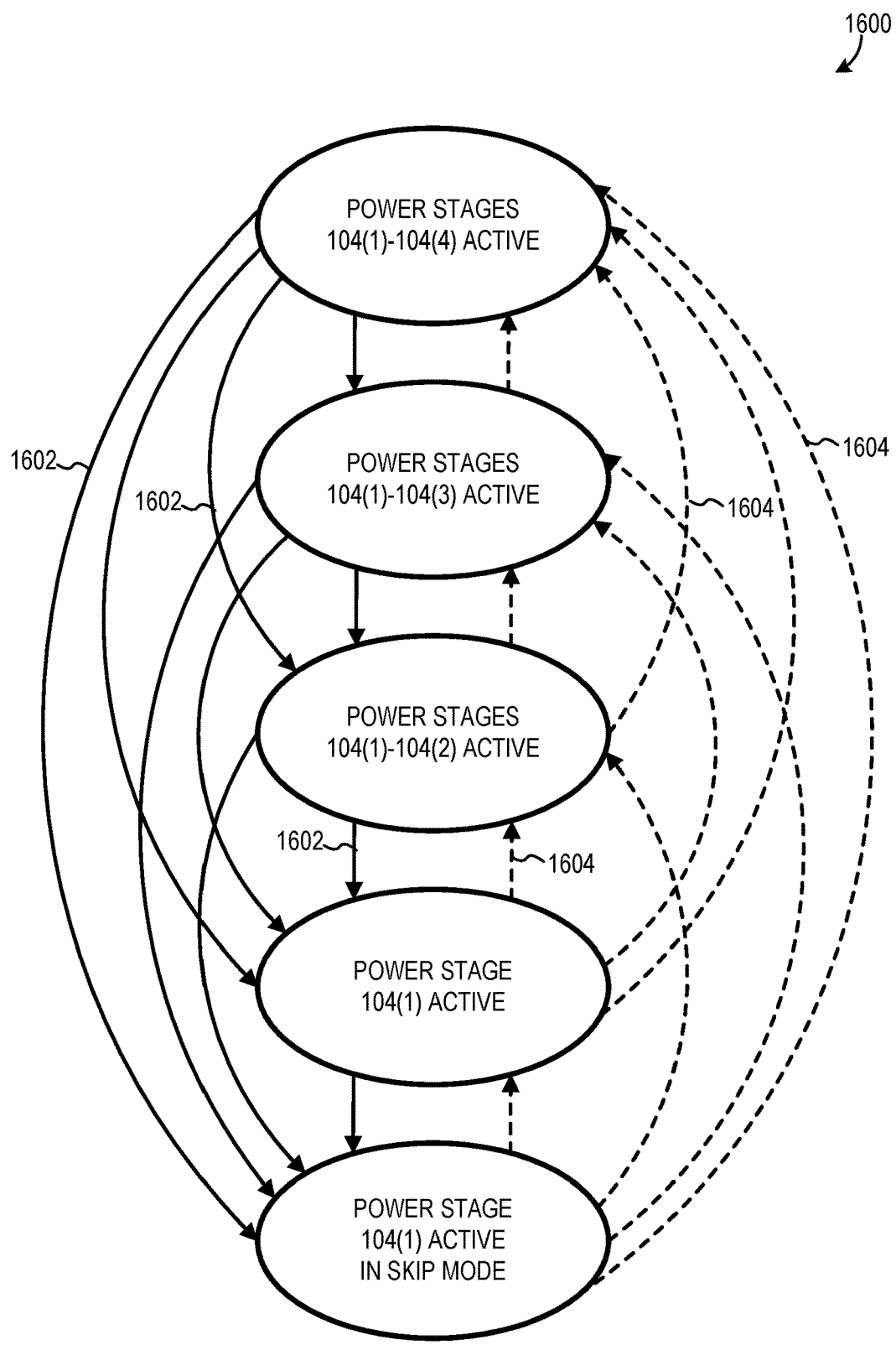
FIG. 16 is a state diagram illustrating phase shedding/adding of one embodiment of the FIG. 1 DC-to-DC converter, according to an embodiment.

In certain embodiments, sequencing circuitry 510 is configured to support both of the phase shedding and phase adding techniques discussed above, thereby enabling both rapid deactivation and rapid activation of power stages 104 in response to a change in magnitude of load current $I_L$. In such embodiments, phase-shedding current threshold values and phase-adding voltage and/or current threshold values are selected, for example, such that phase shedding trigger conditions differ from phase adding trigger conditions, to achieve hysteresis and thereby help prevent oscillation between number of active power stages 104. FIG. 16 is a state diagram 1600 illustrating phase shedding/adding of one embodiment of DC-to-DC converter 100 where N is equal to 4 and sequencing circuitry 510 is configured to support the phase shedding and phase adding techniques discussed above. Arrows 1602 (solid lines) represent phase shedding, and arrows 1604 (dashed lines) represent phase adding. Only several instances of arrows 1602 and 1604 are labeled in FIG. 16 to promote illustrative clarity. As evident from FIG. 16, this embodiment of DC-to-DC converter 100 is capable of quickly changing number of power stages 104 which are active to meeting operating requirement changes. For example, this embodiment can directly change from four active power stages 104 to one active power stage 104 in a single step, thereby promoting fast phase shedding. As another example, this embodiment can directly change from one active power stage 104 to four active power stages 104 in a single step, thereby promoting fast phase adding. It should be noted that the phase shedding and phase adding techniques discussed above are not limited to being implemented in sequencing circuitry 510 but could instead be implemented in another controllers without departing from the scope hereof.

Figure 10:
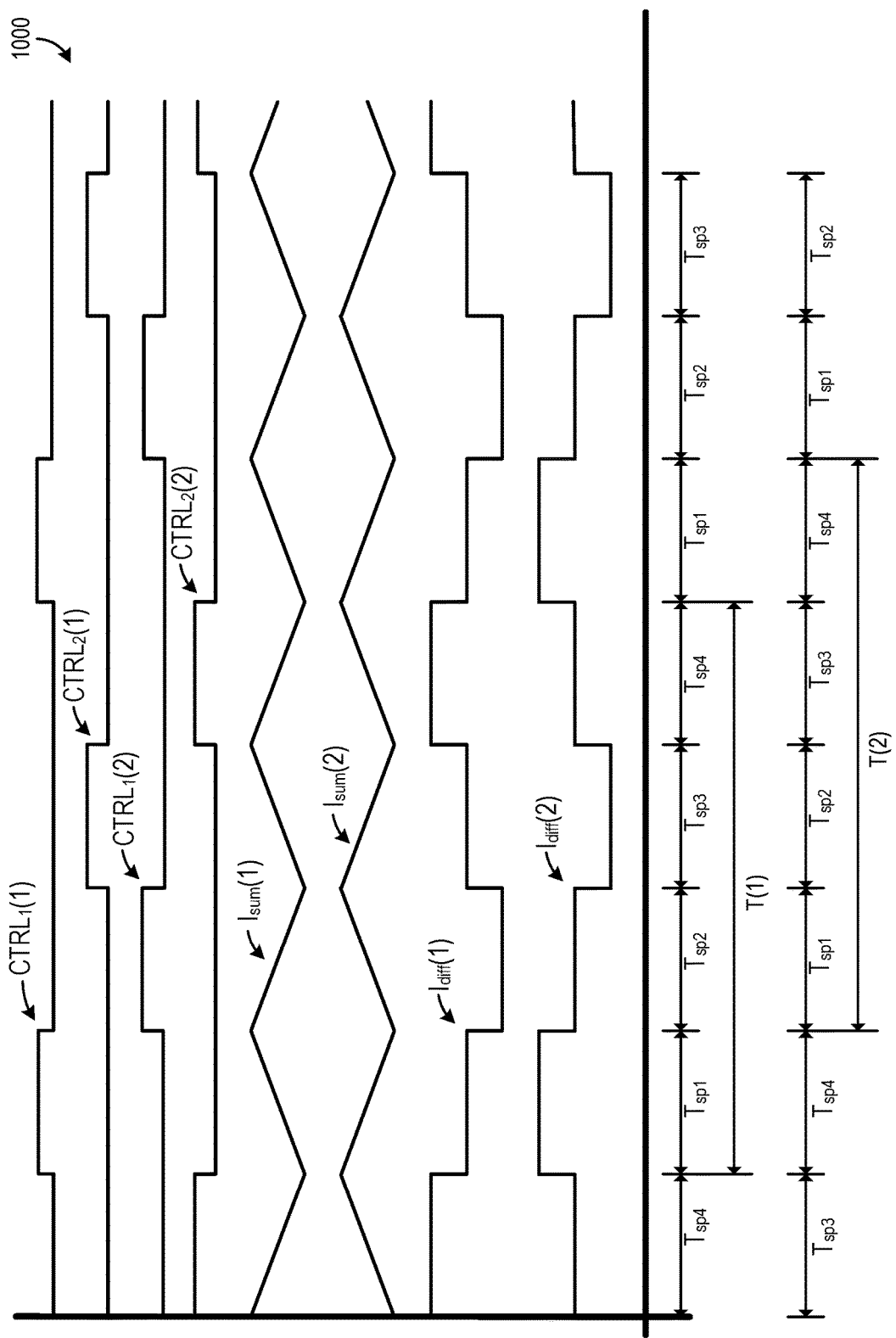
FIG. 10 shows waveforms illustrating one example of operation of an embodiment of the FIG. 1 current doubling forward DC-to-DC converter in a continuous conduction operating mode.

FIG. 10 shows waveforms 1000 illustrating one example of operation of an embodiment of current doubling forward DC-to-DC converter 100 where N is equal to two, or in other words, where current doubling forward DC-to-DC converter 100 includes two power stage 104 instances, i.e. power stages 104(1) and 104(2). FIG. 10 illustrates operation during a continuous conduction operating mode (CCM). In this embodiment, sequencing circuitry 510 is configured to cause each of two-phase controller 508(1) and 508(2) to generate its respective phase control signals out-of-phase with the phase control signals of the other two-phase controller circuitry instance. Accordingly, each power stage 104(1) and 104(2) has respective period T, including sub-periods $T_{sp1}$, $T_{sp2}$, $T_{sp3}$, and $T_{sp4}$, that is out-of-phase with the respective period T of the other power stage.

Waveforms 1000 include curves representing first phase control signal $CTRL_1(1)$, second phase control signal $CTRL_2(1)$, first phase control signal $CTRL_1(2)$, second phase control signal $CTRL_2(2)$, current sum signal $I_{sum}(1)$, current sum signal $I_{sum}(2)$, current difference signal $I_{diff}(1)$, and current difference signal $I_{diff}(2)$. In this example, each of first phase control signal $CTRL_1(1)$, second phase control signal $CTRL_2(1)$, first phase control signal $CTRL_1(2)$, and second phase control signal $CTRL_2(2)$ is in its asserted state when it is logic high. As illustrated, current difference signal $I_{diff}(1)$ has a magnitude of zero during each of first and third sub-periods $T_{sp1}$ and $T_{sp3}$ of its respective period T(1), showing that current difference signal $I_{diff}(1)$ represents the difference between magnitude of current flowing through first rectification switching device 302 and magnitude of current flowing through second rectification switching device 304 of power stage 104(1) solely when current is flowing through both of first and second rectification switching devices 302 and 304. Similarly, current difference signal $I_{diff}(2)$ has a magnitude of zero during each of third and fourth power transfer periods $T_{sp1}$ and $T_{sp3}$ of its respective period T(2).

Figure 11:
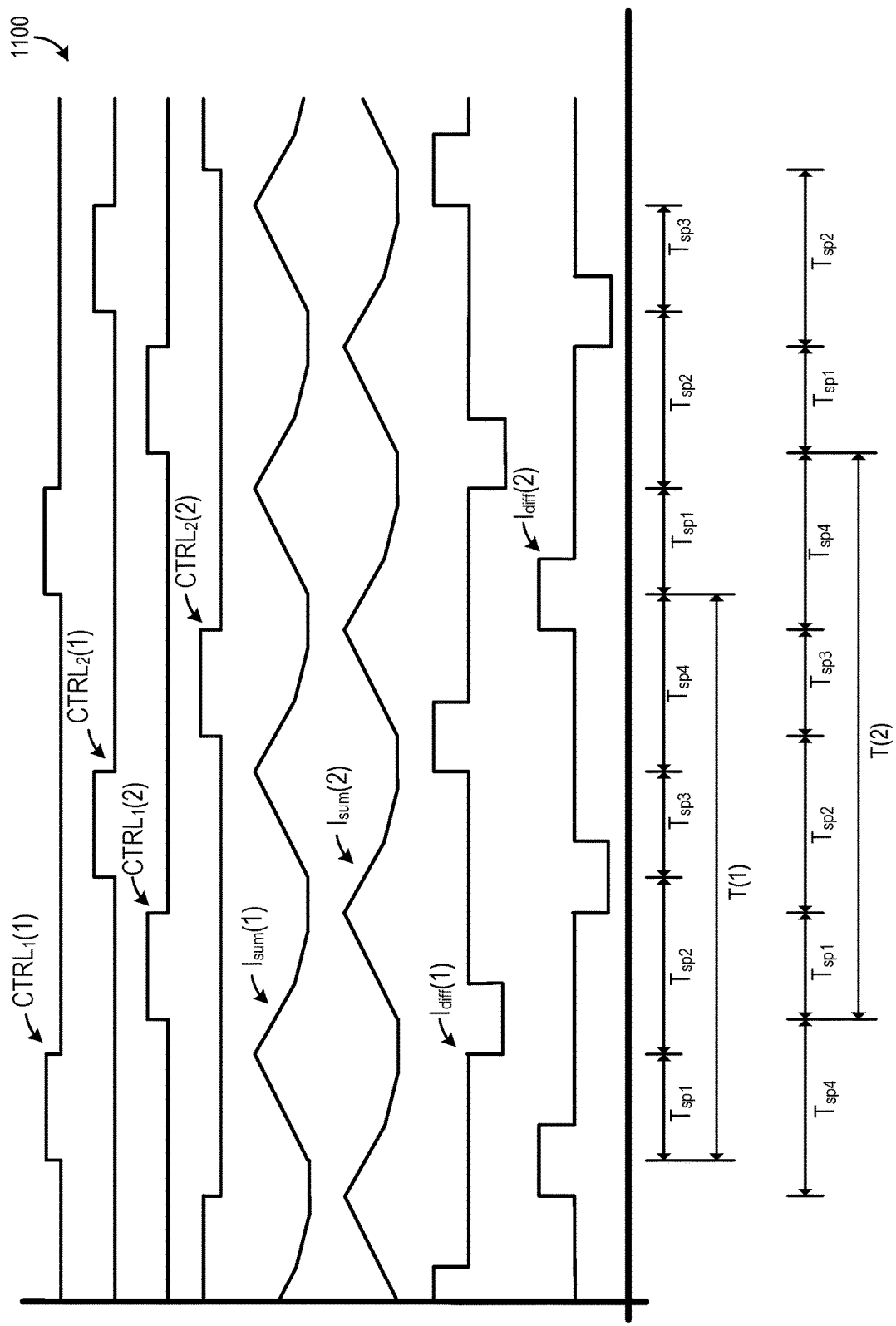
FIG. 11 shows waveforms illustrating one example of operation of an embodiment of the FIG. 1 current doubling forward DC-to-DC converter in a discontinuous conduction operating mode.

FIG. 11 shows waveforms 1100 like waveforms 1000 of FIG. 10, but illustrating one example of operation of current doubling forward DC-to-DC converter 100 in a discontinuous conduction operating mode (DCM) in an embodiment supporting a skip-mode operation. In each power stage 104, control circuitry 306 is configured to cause first rectification switching device 302 to switch from its on state to its off state when current through first rectification switching device 302 falls to zero, in the skip operating mode. Additionally, in each power stage 104, control circuitry 306 is configured to cause second rectification switching device 304 to switch from its on state to its off state when current through second rectification switching device 304 falls to zero, in the skip operating mode.

In an alternate embodiment of current doubling forward DC-to-DC converter 100 (not shown), first inductor 208 and second inductor 210 of each power stage 104 are not magnetically coupled. In other words, in each power stage 104, each of first inductor 208 and second inductor 210 is a discrete inductor in this alternate embodiment.

Figure 12:
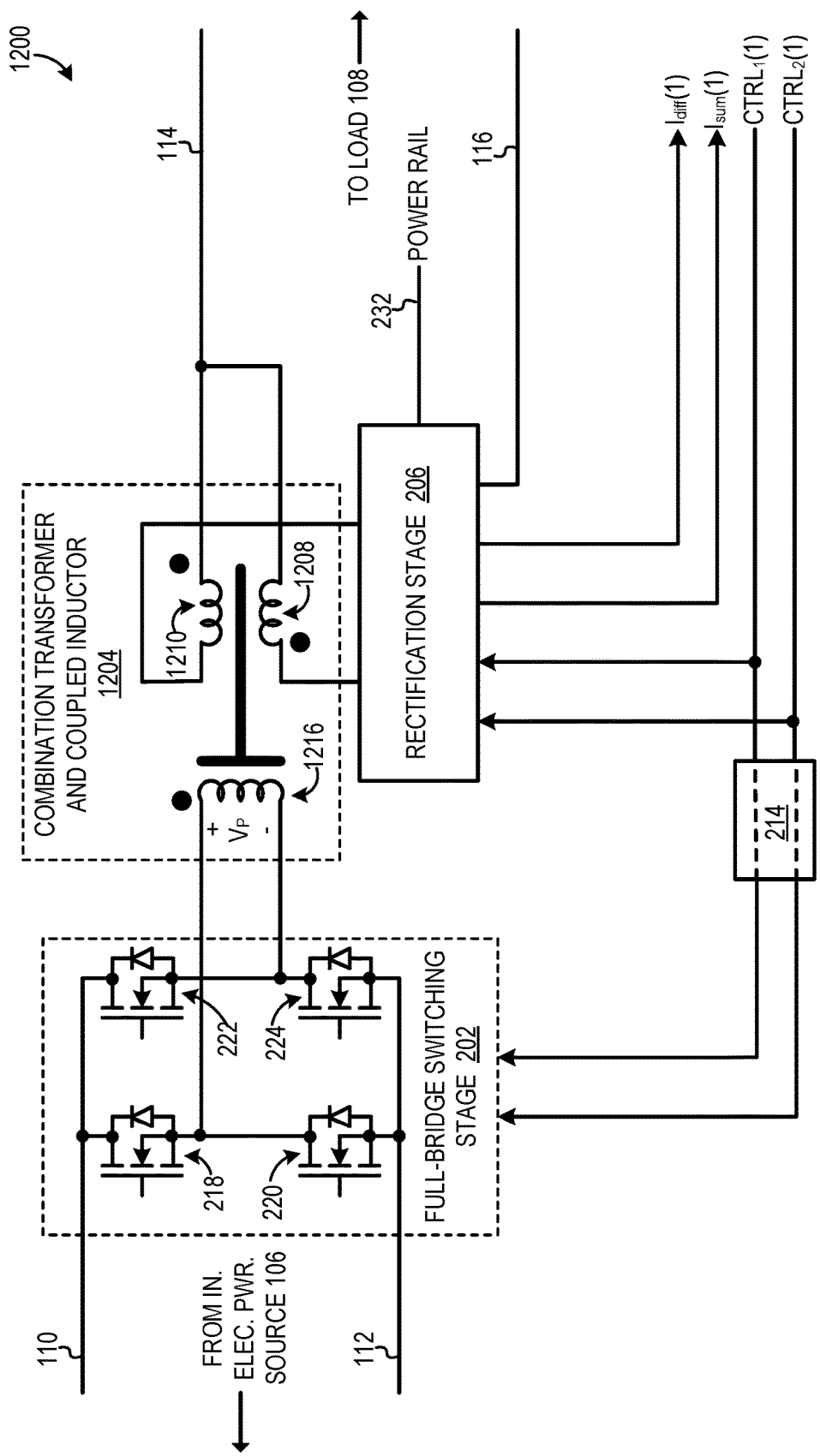
FIG. 12 illustrates a power stage similar to that of FIG. 2 but where the transformer and the inductors of the power stage are replaced by a combination transformer and coupled inductor, according to an embodiment.

In another alternate embodiment of current doubling forward DC-to-DC converter 100, transformer 204, first inductor 208, and second inductor 210 are combined into a combination transformer and coupled inductor, in each power stage 104. For example, FIG. 12 illustrates a power stage 1200 which is like power stage 104(1) of FIGS. 1 and 2, but where transformer 204, first inductor 208, and second inductor 210 are replaced by a combination transformer and coupled inductor 1204. Combination transformer and coupled inductor 1204 includes a primary winding 1216, a first inductive winding 1208, and a second inductive winding 1210. Primary winding 1216 is analogous to primary winding 216 of transformer 204. First inductive winding 1208 serves as first inductor 208, and second inductive winding 1210 serves as second inductor 210. Additionally, first and second inductive windings 1208 and 1210 collectively serve as secondary winding 226. Primary winding 1216 is magnetically coupled with each of first inductive winding 1208 and second inductive winding 1210 to form a transformer, and first inductive winding 1208 is magnetically coupled with second inductive winding 1210 to form a coupled inductor. Thus, combination transformer and coupled inductor 1204 serves as both a transformer and a coupled inductor for power stage 1200. Some possible implementations of combination transformer and coupled inductor 1204 are disclosed in U.S. patent application Ser. No. 15/456,011, filed Mar. 10, 2017.

Figure 13:
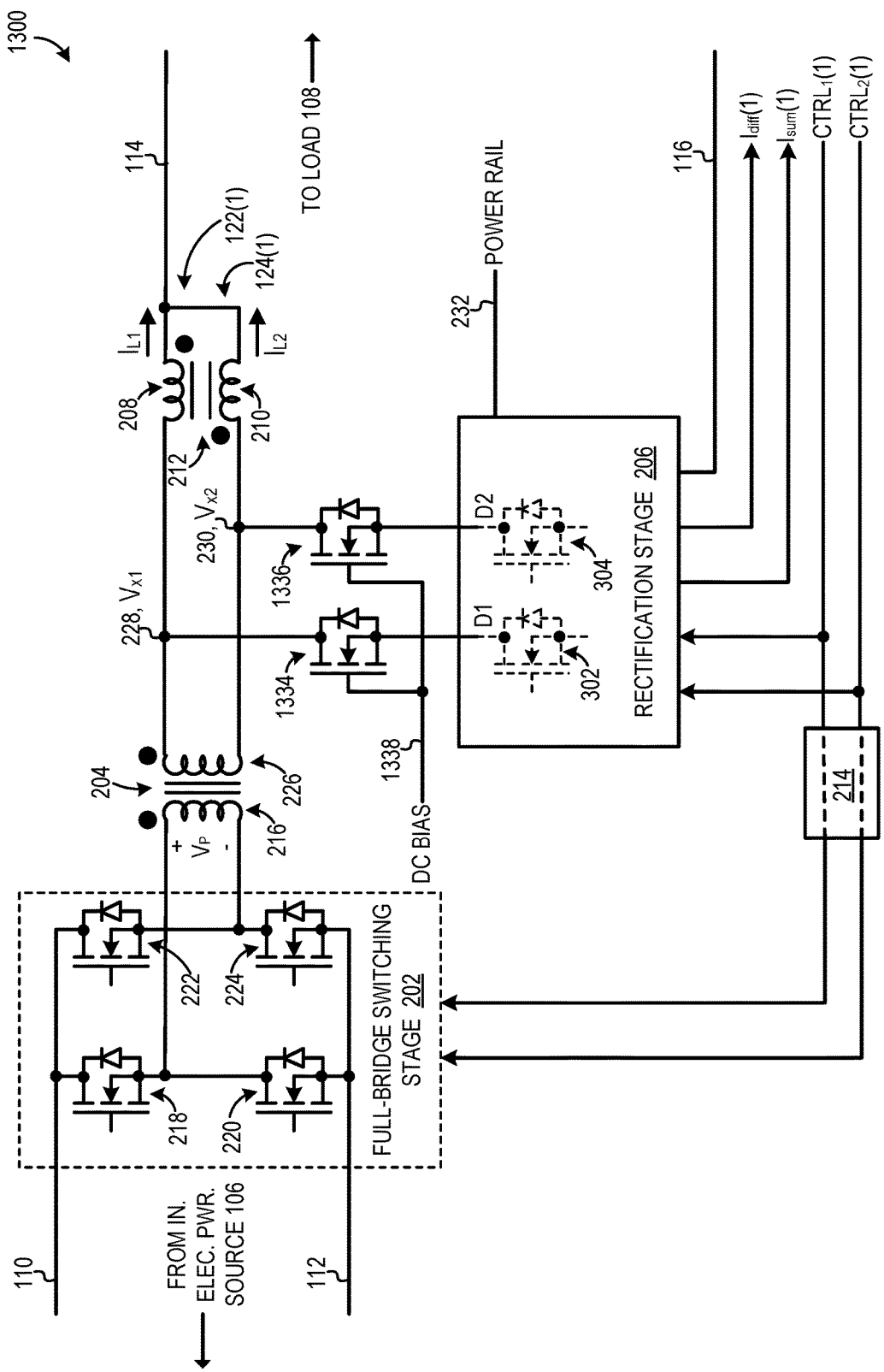
FIG. 13 illustrates a power stage which is similar to that of FIG. 2 but further including first and second cascode transistors, according to an embodiment.

DC-to-DC converter 100 could also be modified to include a respective cascode transistor electrically coupled between each rectification switching device 302, 304 and its respective switching node 228, 230 to enable operation at a voltage that is greater than the maximum voltage rating of first and second rectification switching devices 302 and 304. For example, FIG. 13 illustrates a power stage 1300 which is like power stage 104(1) of FIGS. 1 and 2, but further including a first cascode transistor 1334 and a second cascode transistor 1336. First cascode transistor 1334 is electrically coupled between first switching node 228 and drain D1 of first rectification switching device 302, and second cascode transistor 1336 is electrically coupled between second switching node 230 and drain D2 of second rectification switching device 304. Gates of first and second cascode transistors 1334 and 1336 are electrically coupled to a DC bias source 1338. In some embodiments, DC bias source 1338 has a nominal voltage of 12 volts. Only several features of rectification stage 206 are shown in FIG. 13 to promote illustrative clarity.

First cascode transistor 1334 operates in its on state when first rectification switching device 302 operates in its on state, and first cascode transistor 1334 operates in its off state when first rectification switching device 302 operates in its off state. Similarly, second cascode transistor 1336 operates in its on state when second rectification switching device 304 operates in its on state, and second cascode transistor 1336 operates in its off state when second rectification switching device 304 operates in its off state. Respective drains D1 and D2 of first and second rectification switching devices 302 and 304 are constrained to a maximum voltage close to the voltage of DC bias source 1338 when first and second cascode transistors 1334 and 1336 are in their respective off states. Consequently, first and second cascode transistors 1334 and 1336 limit maximum voltage across first and second rectification switching devices 302 and 304, and in some embodiments, each of first and second cascode transistors 1334 and 1336 has a higher voltage rating than that of first and second rectification switching devices 302 and 304, to enable DC-to-DC converter 100 to operate at a voltage that is greater than the voltage rating of first and second rectification switching devices 302 and 304.

Figure 14:
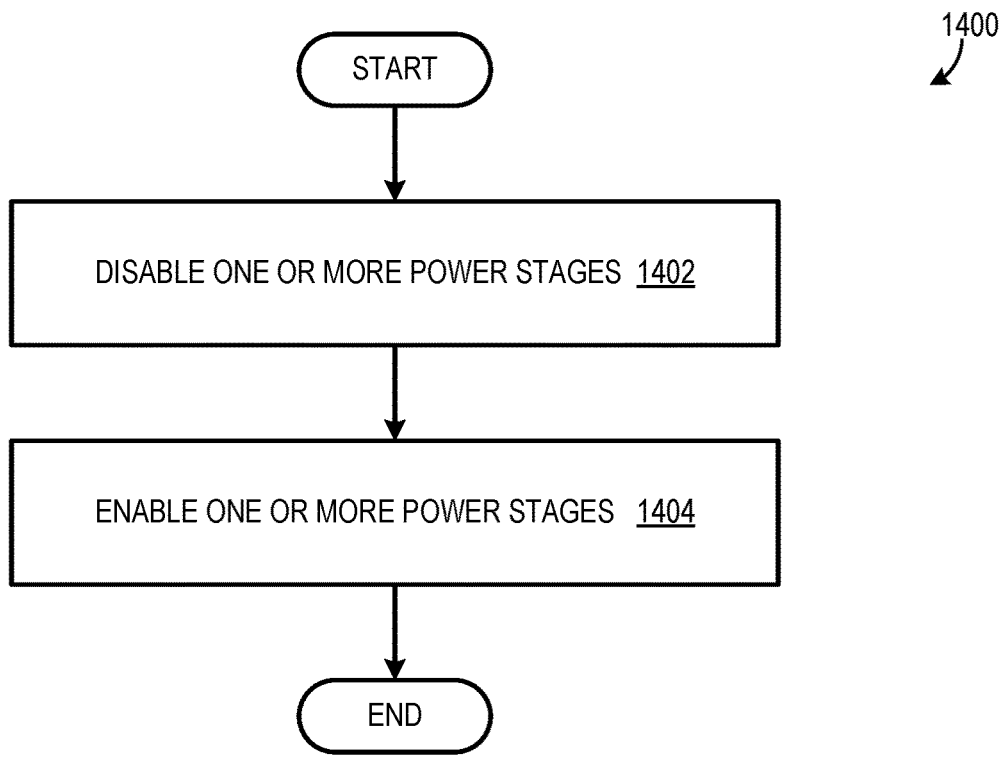
FIG. 14 illustrates a method for changing number of active power stages in a current doubling forward DC-to-DC converter, according to an embodiment.

FIG. 14 illustrates a method 1400 for changing number of active power stages in a current doubling forward DC-to-DC converter. In step 1402, one or more of a plurality of power stages of the current doubling forward DC-to-DC converter are disabled in response to a load current of the DC-to-DC converter being at a phase-shedding current threshold value. In one example of step 1402, sequencing circuitry 510 disables one or more power stages 104 of current doubling forward DC-to-DC converter 100 in response to magnitude of load current $I_L$ falling to a phase-shedding current threshold value. In step 1404, one or more of the plurality of power stages are enabled in response to a voltage feedback signal being at a phase-adding voltage threshold value, where the voltage feedback signal represents an output voltage of the DC-to-DC converter. In one example of step 1404, sequencing circuitry 510 enables one or more power stages 104 of current doubling forward DC-to-DC converter 100 in response to voltage feedback signal FB falling below a phase-adding voltage threshold value.

Figure 15:
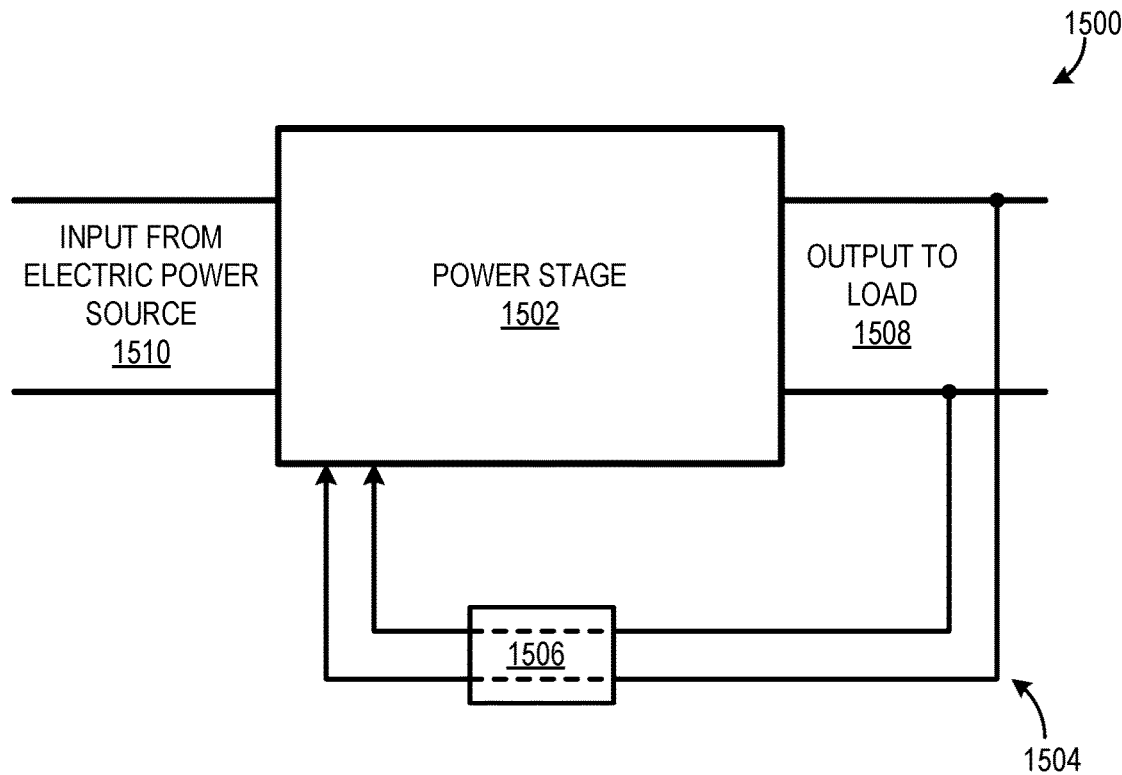
FIG. 15 illustrates a power converter including a digital isolator, according to an embodiment.

Applicant has additionally determined that the above-discussed advantages associated with use of a digital isolator in place of an optocoupler are also potentially applicable in power conversion devices having a topology other than a current doubling forward topology. For example, FIG. 15 illustrates a power converter 1500 including a power stage 1502 and a control system feedback loop 1504, where feedback loop 1504 includes a digital isolator 1506. Digital isolator 1506 is used, for example, to maintain galvanic isolation in feedback loop 1504 and/or to level-shift signals in feedback loop 1504. Feedback loop 1504 is, for example, part of a voltage-mode control system or a current-mode control system of power converter 1500, such as for regulating magnitude of voltage across an output 1508 of power converter 1500 and/or for regulating magnitude of current flowing through output 1508. Power stage 1502 transfers electric power between an input 1510 of power converter 1500 and output 1508 of power converter 1500. Power stage 1502 may have any topology, including but not limited to a forward topology, a flyback topology, a half-bridge topology, or a full-bridge topology. In certain embodiments, digital isolator 1506 is the MAX14930F digital isolator from Maxim Integrated Products, Incorporated. Use of digital isolator 1506 instead of a conventional optocoupler enables power converter 1500 to have a larger control system bandwidth and associated faster transient response than would be possible if instead using an optocoupler in place of digital isolator 1506.

Figure 17:
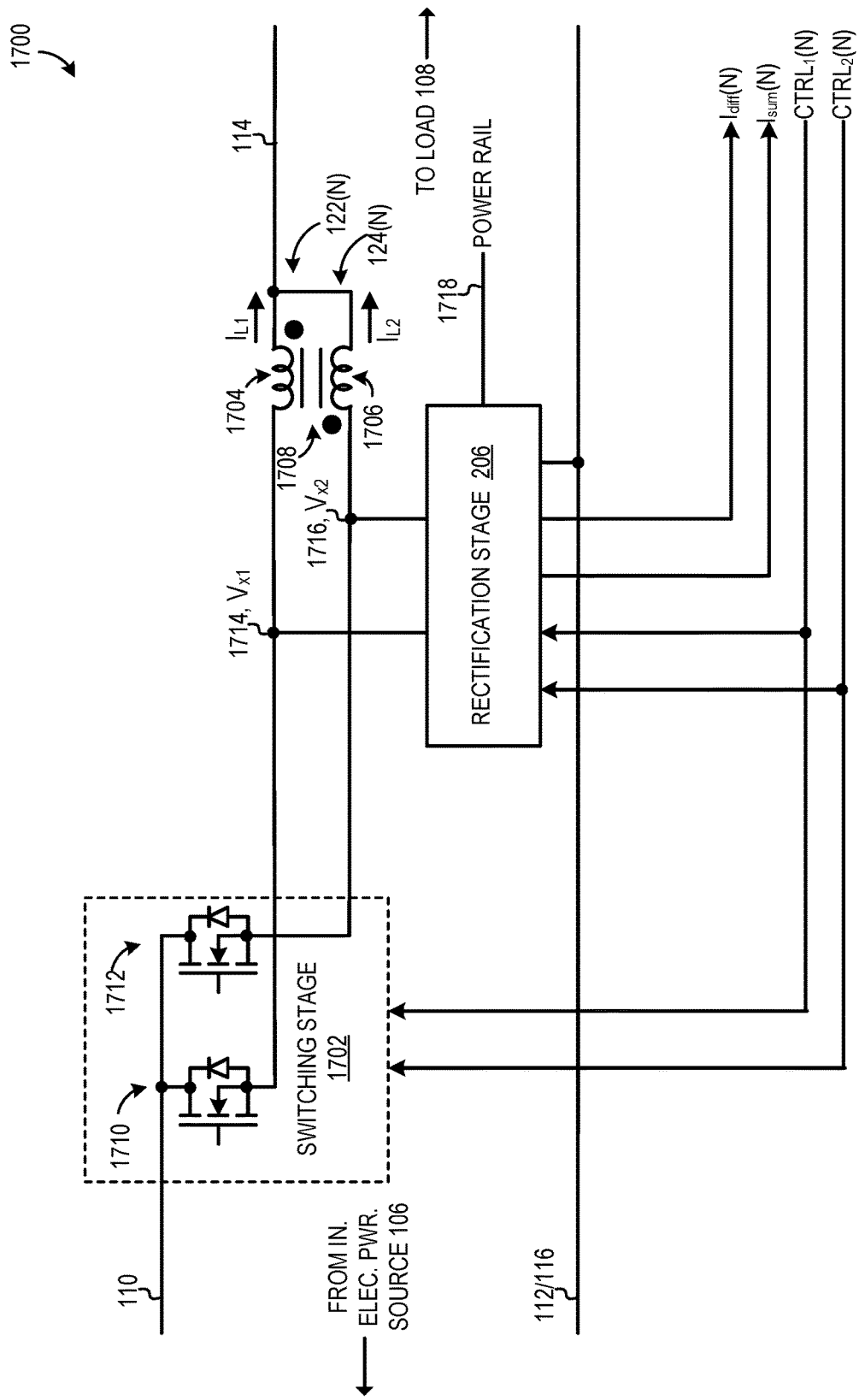
FIG. 17 illustrates an alternate embodiment of a power stage.

Although the new DC-to-DC converter controllers are generally discussed above with respect to current doubling forward DC-to-DC converters, the new DC-to-DC controllers are not limited to use with current doubling forward DC-to-DC converters. For example, current doubling forward DC-to-DC converter 100 could be modified to have a non-isolated buck topology by replacing each power stage 104 with an instance of a power stage 1700, which is illustrated in FIG. 17.

Power stage 1700 includes a switching stage 1702, an instance of rectification stage 206, a first inductor 1704, and a second inductor 1706. First inductor 1704 and second inductor 1706 are magnetically coupled with each other and are part of a common coupled inductor 1708. Input reference node 112 and output reference node 116 are joined into a common reference node in power stage 1700. Switching nodes 1714 and 1716 are respectively analogous to first and second switching nodes 228 and 230 of power stage 200. Rectification stage 206 operates as discussed above with respect to FIGS. 2 and 3, and details of rectification device 206 are not shown in FIG. 17 to promote illustrative clarity. Power rail 1718 is optional, and power rail 1718 is analogous to power rail 232 of FIG. 2. Transistor 1710, first rectification switching device 302 of rectification stage 206, and first inductor 1704 collectively form a first phase 122 of power stage 1700. Similarly, transistor 1712, second rectification switching device 304 of rectification stage 206, and second inductor 1706 collectively form a second phase 124 of power stage 1700.

Switching stage 1702 is electrically coupled between input electric power source 106 and coupled inductor 1708. Switching stage 202 includes two transistors 1710 and 1712 configured to switch at least partially under control of first and second phase control signals $CTRL_1(1)$ and $CTRL_2(1)$ from DC-to-DC converter controller 102. In particular, transistor 1710 operates in its on state when first phase control signal $CTRL_1(1)$ is asserted, and transistor 1710 operates in its off state when first phase control signal $CTRL_1(1)$ is de-asserted. Transistor 1712 operates in its on state when second phase control signal $CTRL_2(1)$ is asserted, and transistor 1712 operates in its off state when second phase control signal $CTRL_2(1)$ is de-asserted. In some embodiments, DC-to-DC converter controller 102 is configured to allow each of transistors 1710 and 1712 to simultaneously operate in their respective on states, to enable high current slew rate in power stage 1700.

Although switching stage 1702 is illustrated with transistors 1710 and 1712 as being n-channel MOSFETs, transistors 1710 and 1712 could be replaced with a different type of transistors, such as with p-channel MOSFETs or bipolar junction transistors, without departing from the scope hereof. Additionally, rectification stage 206 could be replaced with rectification stage 400 of FIG. 4, without departing from the scope hereof.

Combinations of Features

Features described above may be combined in various ways without departing from the scope hereof. The following examples illustrate some possible combinations:

(A1) A DC-to-DC converter controller may be configured to generate phase control signals to control a plurality of power stages of a current doubling forward DC-to-DC converter where each power stage includes two phases, and the DC-to-DC converter controller may be configured to generate the phase control signals in a manner which (a) balances magnitude of current processed among the two phases of each power stage and (b) balances magnitude of current processed among the plurality of power stages.

(A2) In the DC-to-DC converter controller denoted as (A1), the DC-to-DC converter controller may be further configured to generate the phase control signals such that (a) the two phases of each power stage are fired in an alternating manner and (b) the plurality of power stages are fired in a rotating manner.

(A3) In any one of the DC-to-DC converter controllers denoted as (A1) and (A2), the DC-to-DC converter controller may be further configured to control a duration that each phase control signal is asserted in proportion to a voltage feedback signal and in inverse proportion to a secondary input voltage signal, the voltage feedback signal representing an output voltage of the DC-to-DC converter and the secondary input voltage signal representing a switching voltage at a switching node of the DC-to-DC converter.

(A4) In any one of the DC-to-DC converter controllers denoted as (A1) through (A3), the DC-to-DC converter controller may be further configured to (a) disable one or more of the plurality of power stages in response to magnitude of a load current of the DC-to-DC converter being at a phase-shedding current threshold value, and (b) enable one or more of the plurality of power stages in response to a difference between a desired output voltage of the DC-to-DC converter and an actual output voltage of the DC-to-DC converter being at a phase-adding voltage threshold value.

(A5) In any one of the DC-to-DC converter controllers denoted as (A1) through (A3), the DC-to-DC converter controller may be further configured to (a) disable one or more of the plurality of power stages in response to magnitude of a load current of the DC-to-DC converter being at a phase-shedding current threshold value, and (b) enable one or more of the plurality of power stages in response to one or more of (1) a difference between a desired output voltage of the DC-to-DC converter and an actual output voltage of the DC-to-DC converter being at a phase-adding voltage threshold value and (2) a magnitude of a load current of the DC-to-DC converter being at a phase-adding current threshold value.

(A6) In any one of the DC-to-DC converter controllers denoted as (A1) through (A5), for each power stage of the plurality of power stages, the DC-to-DC converter controller may be further configured to trigger assertion of phase control signals for the power stage at least partially based on a comparison between (1) a sum of (a) an AC component of a respective current sum signal of the power stage, the current sum signal representing a sum of current flowing through two inductors of the power stage, (b) a voltage feedback signal representing an output voltage of the DC-to-DC converter, and (c) a voltage error signal, and (2) a target voltage signal.

(A7) In the DC-to-DC converter controller denoted as (A6), the DC-to-DC converter controller may be further configured to generate the voltage error signal from a difference between the voltage feedback signal and the target voltage signal.

(A8) In the DC-to-DC converter controller denoted as (A7), the DC-to-DC converter controller may be further configured to include a slope signal in the voltage error signal.

(A9) In any one of the DC-to-DC converter controllers denoted as (A6) through (A8), the DC-to-DC converter controller may be further configured to adjust the target voltage signal to compensate for a voltage drop across a reference power distribution bus.

(B1) A current doubling forward direct current to direct current (DC-to-DC) converter may include (1) a plurality of power stages, each power stage including two phases and (2) a DC-to-DC converter controller configured to generate phase control signals to control the plurality power stages, the DC-to-DC converter controller configured to generate the phase control signals in a manner which (a) balances magnitude of current processed among the two phases of each of the plurality of power stages and (b) balances magnitude of current processed among the plurality of power stages.

(B2) In the current doubling forward DC-to-DC converter denoted as (B1), the DC-to-DC converter controller may be further configured to generate the phase control signals such that (a) the two phases of each power stage are fired in an alternating manner and (b) the plurality of power stages are fired in a rotating manner.

(B3) In any one the current doubling forward DC-to-DC converters denoted as (B1) and (B2), the DC-to-DC converter controller may be further configured to control a duration that each phase control signal is asserted in proportion to a voltage feedback signal and in inverse proportion to a secondary input voltage signal, the voltage feedback signal representing an output voltage of the DC-to-DC converter and the secondary input voltage signal representing a switching voltage at a switching node of the DC-to-DC converter.

(B4) In any one of the current doubling forward DC-to-DC converters denoted as (B1) through (B3), the DC-to-DC converter controller may be further configured to (1) disable one or more of the plurality of power stages in response to magnitude of a load current of the DC-to-DC converter being at a phase-shedding current threshold value and (2) enable one or more of the plurality of power stages in response to a difference between a desired output voltage of the DC-to-DC converter and an actual output voltage of the DC-to-DC converter being at a phase-adding voltage threshold value.

(B5) In any one of the current doubling forward DC-to-DC converters denoted as (B1) through (B3), the DC-to-DC converter controller may be further configured to (a) disable one or more of the plurality of power stages in response to magnitude of a load current of the DC-to-DC converter being at a phase-shedding current threshold value and (b) enable one or more of the plurality of power stages in response to one or more of (1) a difference between a desired output voltage of the DC-to-DC converter and an actual output voltage of the DC-to-DC converter being at a phase-adding voltage threshold value and (2) a magnitude of a load current of the DC-to-DC converter being at a phase-adding current threshold value.

(B6) In any one of the current doubling forward DC-to-DC converters denoted as (B1) through (B5), for each power stage of the plurality of power stages, the DC-to-DC converter controller may be further configured to trigger assertion of phase control signals for the power stage at least partially based on a comparison between (1) a sum of (a) an AC component of a respective current sum signal of the power stage, the current sum signal representing a sum of current flowing through two inductors of the power stage, (b) a voltage feedback signal representing an output voltage of the DC-to-DC converter, and (c) a voltage error signal and (2) a target voltage signal.

(B7) In the current doubling forward DC-to-DC converter denoted as (B6), the DC-to-DC converter controller may be further configured to generate the voltage error signal from a difference between the voltage feedback signal and the target voltage signal.

(B8) In the current doubling forward DC-to-DC converter denoted as (B7), the DC-to-DC converter controller may be further configured to include a slope signal in the voltage error signal.

(B9) In any one of current doubling forward DC-to-DC converters denoted as (B6) through (B8), the DC-to-DC converter controller may be further configured to adjust the target voltage signal to compensate for a voltage drop across a reference power distribution bus.

(B10) In any one of the current doubling forward DC-to-DC converters denoted as (B1) through (B9), each of the plurality of power stages may include (1) a transformer including a primary winding and a secondary winding, (2) a full-bridge switching stage configured to generate an alternating current (AC) voltage across the primary winding, (3) first and second inductors electrically coupled to the secondary winding at respective first and second switching nodes, and (4) a rectification stage electrically coupled to each of the first and second switching nodes.

(B11) In the current doubling forward DC-to-DC converter denoted as (B10), in each of the plurality power stages, the first and second inductors may be magnetically coupled with each other.

(B12) In any one of the current doubling forward DC-to-DC converters denoted as (B10) and (B11), in each the plurality of power stages, the transformer, the first inductor, and the second inductor may be part of a combination transformer and coupled inductor.

(B13) In any one of the current doubling forward DC-to-DC converters denoted as (B10) through (B12), each the plurality of power stages may further include current reconstructor circuitry configured to generate a respective current difference signal of the power stage, the current difference signal representing at least a difference in magnitude of current flowing through the first inductor of the power stage and magnitude of current flowing through the second inductor of the power stage, and the DC-to-DC converter controller may be further configured to generate the phase control signals in a manner which minimizes an integral of the respective current difference signal of each of the plurality of power stages, to balance magnitude of current processed among the two phases of each power stage.

(B14) In the current doubling forward DC-to-DC converter denoted as (B13) in each of the plurality of power stages, the rectification stage may include respective first and second rectification switching devices electrically coupled to the first and second switching nodes of the power stage, respectively, and the current reconstructor circuitry may be further configured to generate the respective current difference signal of the power stage solely when current is simultaneously flowing through each of the first and second rectification switching devices of the power stage.

(B15) In any one of the current doubling forward DC-to-DC converters denoted as (B13) and (B14), (1) in each of the plurality of power stages, the current reconstructor circuitry may be further configured to generate a respective current sum signal of the power stage, the current sum signal representing a sum of magnitude of current flowing through the first inductor of the power stage and magnitude of current flowing through the second inductor of the power stage, (2) the DC-to-DC converter controller may be further configured to generate one or more current balancing signals, each current balancing signal representing a difference between respective current sum signals of two power stages of the plurality of power stages, and (3) the DC-to-DC converter controller may be further configured to generate the phase control signals in a manner which minimizes the one or more current balancing signals, to balance magnitude of current processed among the plurality of power stages.

(B16) Any one of the current doubling forward DC-to-DC converters denoted as (B10) through (B15) may further include a respective digital isolator for each of the plurality of power stages, each digital isolator being configured to transmit phase control signals to the full-bridge switching stage of its respective power stage while maintaining galvanic isolation.

(B17) In any one of the current doubling forward DC-to-DC converters denoted as (B10) through (B16), each of the plurality of power stages may further include (1) a first diode device having an anode electrically coupled to the first switching node of the power stage and a cathode connected to a power rail and (2) a second diode device having an anode electrically coupled to the second switching node of the power stage and a cathode connected to the power rail.

(B18) In any one of the current doubling forward DC-to-DC converters denoted as (B10) through (B17), each of the plurality of power stages may further include first and second cascode transistors electrically coupled between the rectification stage and the first and second switching nodes, respectively.

(C1) A current doubling forward direct current to direct current (DC-to-DC) converter may include (1) a plurality of power stages, each of the plurality of power stages including two phases and (2) a DC-to-DC converter controller configured to (a) cause the two phases of each power stage to fire in an alternating manner and (b) cause the plurality of power stages to fire in a rotating manner.

(C2) In the current doubling forward DC-to-DC converter denoted as (C1), each of the plurality of power stages may include (1) a transformer including a primary winding and a secondary winding, (2) a full-bridge switching stage configured to generate an alternating current (AC) voltage across the primary winding, (3) first and second inductors electrically coupled to the secondary winding at respective first and second switching nodes, and (4) a rectification stage electrically coupled to each of the first and second switching nodes.

(C3) In the current doubling forward DC-to-DC converter denoted as (C2), in each of the plurality power stages, the first and second inductors may be magnetically coupled with each other.

(C4) In any one of the current doubling forward DC-to-DC converters denoted as (C2) and (C3), in each the plurality of power stages, the transformer, the first inductor, and the second inductor may be part of a combination transformer and coupled inductor of the power stage.

(D1) A current doubling forward direct current to direct current (DC-to-DC) converter may include (1) a plurality of power stages, each of the plurality of power stages including two phases and (2) a DC-to-DC converter controller configured to (a) disable one or more of the plurality of power stages in response to magnitude of a load current of the DC-to-DC converter being at a phase-shedding current threshold value and (b) enable one or more of the plurality of power stages in response to a difference between a desired output voltage of the DC-to-DC converter and an actual output voltage of the DC-to-DC converter being at a phase-adding voltage threshold value.

(D2) In the current doubling forward DC-to-DC converter denoted as (D1), the DC-to-DC converter controller may be further configured to enable one or more of the plurality of power stages in response to a magnitude of a load current of the DC-to-DC converter being at a phase-adding current threshold value.

(D3) In any one of the current doubling forward DC-to-DC converters denoted as (D1) and (D2), each of the plurality of power stages may include (1) a transformer including a primary winding and a secondary winding, (2) a full-bridge switching stage configured to generate an alternating current (AC) voltage across the primary winding, (3) first and second inductors electrically coupled to the secondary winding at respective first and second switching nodes, and (4) a rectification stage electrically coupled to each of the first and second switching nodes.

(D4) In the current doubling forward DC-to-DC converter denoted as (D3), in each of the plurality of power stages, the respective first and second inductors of the power stage may be magnetically coupled with each other.

(D5) In the current doubling forward DC-to-DC converter denoted as (D4), in each the plurality of power stages, the transformer, the first inductor, and the second inductor may be part of a combination transformer and coupled inductor of the power stage.

(E1) A current doubling forward direct current to direct current (DC-to-DC) converter may include (1) a plurality of power stages, each of the plurality of power stages including (a) a transformer including a primary winding and a secondary winding, (b) a full-bridge switching stage configured to generate an alternating current (AC) voltage across the primary winding, (c) first and second inductors electrically coupled to the secondary winding at respective first and second switching nodes, and (d) a rectification stage electrically coupled to each of the first and second switching nodes; (2) a DC-to-DC converter controller configured to generate phase control signals to control the plurality power stages; and (3) a respective digital isolator for each of the plurality of power stages, each digital isolator configured to transmit phase control signals to the full-bridge switching stage of its respective power stage while maintaining galvanic isolation.

(E2) In the current doubling forward DC-to-DC converter denoted as (E1), in each of the plurality power stages, the first and second inductors may be magnetically coupled with each other.

(E3) In any one of the current doubling forward DC-to-DC converters denoted as (E1) and (E2), in each the plurality of power stages, the transformer, the first inductor, and the second inductor may be part of a combination transformer and coupled inductor.

(F1) A method for operating a current doubling forward direct current to direct current (DC-to-DC) converter may include generating phase control signals to control a plurality of power stages of the current doubling forward DC-to-DC converter in a manner such that (1) magnitude of current processed among respective first and second phases of each power stage is balanced and (2) magnitude of current processed among the plurality of power stages is balanced.

(F2) The method denoted as (F1) may further include generating the phase control signals such that (1) the respective first and second phases of each power stage are fired in an alternating manner and (2) the plurality of power stages are fired in a rotating manner.

(F3) Any one of the methods denoted as (F1) and (F2) may further include controlling a duration that each phase control signal is asserted in proportion to a voltage feedback signal and in inverse proportion to a secondary input voltage signal, the voltage feedback signal representing an output voltage of the DC-to-DC converter and the secondary input voltage signal representing a switching voltage at a switching node of the DC-to-DC converter.

(F4) Any one of the methods denoted as (F1) through (F3) may further include (1) disabling one or more of the plurality of power stages in response to magnitude of a load current of the DC-to-DC converter being at a phase-shedding current threshold value and (2) enabling one or more of the plurality of power stages in response to a difference between a desired output voltage of the DC-to-DC converter and an actual output voltage of the DC-to-DC converter being at a phase-adding voltage threshold value.

(F5) Any one of the methods denoted as (F1) through (F3) may further include (a) disabling one or more of the plurality of power stages in response to magnitude of a load current of the DC-to-DC converter being at a phase-shedding current threshold value and (b) enabling one or more of plurality of power stages in response to one or more of (1) a difference between a desired output voltage of the DC-to-DC converter and an actual output voltage of the DC-to-DC converter being at a phase-adding voltage threshold value and (2) a magnitude of a load current of the DC-to-DC converter being at a phase-adding current threshold value.

(F6) Any one of the methods denoted as (F1) through (F5) may further include (1) generating a respective current difference signal for each of the plurality of power stages, each current difference signal representing at least a difference in magnitude of current flowing through first and second inductors of its respective power stage and (2) generating the phase control signals in a manner which minimizes an integral of the respective current difference signal of each of the plurality of power stages, to balance magnitude of current processed among the first and second phases of each power stage.

(F7) The method denoted as (F6) may further include generating the respective current difference signal for each of the plurality of power stages from a difference between current flowing through first and second rectification switching devices of the power stage solely when current is simultaneously flowing through each of the first and second rectification switching device of the power stage.

(F8) Either of the methods denoted as (F6) and (F7) may further include (1) generating a respective current sum signal for each of the plurality of power stages, each current sum signal representing a sum of magnitude of current flowing through first and second inductors of its respective power stage, (2) generating one or more current balancing signals, each current balancing signal representing a difference between respective current sum signals of two power stages of the plurality of power stages; and (3) generating the phase control signals in a manner which minimizes the one or more current balancing signals, to balance magnitude of current processed among the plurality of power stages.

(F9) Any of the methods denoted as (F1) through (F8) may further include clamping respective first and second switching nodes of each of the plurality of power stages to a power rail using a diode device for each switching node.

(G1) A method for changing number of active power stages in a current doubling forward direct current to direct current (DC-to-DC) converter may include (1) disabling one or more of a plurality of power stages of the current doubling forward DC-to-DC converter in response to a load current of the DC-to-DC converter being at a phase-shedding current threshold value and (2) enabling one or more of the plurality of power stages in response to a difference between a desired output voltage of the DC-to-DC converter and an actual output voltage of the DC-to-DC converter being at a phase-adding voltage threshold value.

(G2) The method denoted as (G1) may further include enabling one or more of the plurality of power stages in response to a magnitude of a load current of the DC-to-DC converter being at a phase-adding current threshold value.

(H1) A power converter may include (1) a power stage and (2) a control system feedback loop including a digital isolator.

(H2) In the power converter denoted as (H1), the power stage may have a topology selected from the group consisting of a forward topology, a flyback topology, a half-bridge topology, and a full-bridge topology.

(I1) A DC-to-DC converter controller may be configured to generate phase control signals to control a plurality of power stages of a DC-to-DC converter where each power stage includes two phases, and the DC-to-DC converter controller may be configured to generate the phase control signals in a manner which (a) balances magnitude of current processed among the two phases of each power stage and (b) balances magnitude of current processed among the plurality of power stages.

(I2) In the DC-to-DC converter controller denoted as (I1), the DC-to-DC converter controller may be further configured to generate the phase control signals such that (a) the two phases of each power stage are fired in an alternating manner and (b) the plurality of power stages are fired in a rotating manner.

(I3) In any one of the DC-to-DC converter controllers denoted as (I1) and (I2), the DC-to-DC converter controller may be further configured to control a duration that each phase control signal is asserted in proportion to a voltage feedback signal and in inverse proportion to a secondary input voltage signal, the voltage feedback signal representing an output voltage of the DC-to-DC converter and the secondary input voltage signal representing a switching voltage at a switching node of the DC-to-DC converter.

(I4) In any one of the DC-to-DC converter controllers denoted as (I1) through (I3), the DC-to-DC converter controller may be further configured to (1) disable one or more of the plurality of power stages in response to magnitude of a load current of the DC-to-DC converter being at a phase-shedding current threshold value and (2) enable one or more of the plurality of power stages in response to a difference between a desired output voltage of the DC-to-DC converter and an actual output voltage of the DC-to-DC converter being at a phase-adding voltage threshold value.

(I5) In any one of the DC-to-DC converter controllers denoted as (I1) through (I3), the DC-to-DC converter controller may be further configured to (1) disable one or more of the plurality of power stages in response to magnitude of a load current of the DC-to-DC converter being at a phase-shedding current threshold value and (2) enable one or more of the plurality of power stages in response to one or more of (1) a difference between a desired output voltage of the DC-to-DC converter and an actual output voltage of the DC-to-DC converter being at a phase-adding voltage threshold value and (2) a magnitude of a load current of the DC-to-DC converter being at a phase-adding current threshold value.

(I6) In any one of the DC-to-DC converter controllers denoted as (I1) through (I5), for each power stage of the plurality of power stages, the DC-to-DC converter controller may be further configured to trigger assertion of phase control signals for the power stage at least partially based on a comparison between (1) a sum of (a) an AC component of a respective current sum signal of the power stage, the current sum signal representing a sum of current flowing through two inductors of the power stage, (b) a voltage feedback signal representing an output voltage of the DC-to-DC converter, and (c) a voltage error signal; and (2) a target voltage signal.

(I7) In the DC-to-DC converter controller denoted as (I6), the DC-to-DC converter controller may be further configured to generate the voltage error signal from a difference between the voltage feedback signal and the target voltage signal.

(I8) In the DC-to-DC converter controller denoted as (I7), the DC-to-DC converter controller may be further configured to include a slope signal in the voltage error signal.

(I9) In any one of the DC-to-DC converter controllers denoted as (I6) through (I8), the DC-to-DC converter controller may be further configured to adjust the target voltage signal to compensate for a voltage drop across a reference power distribution bus.

(J1) A method for operating a direct current to direct current (DC-to-DC) converter may include generating phase control signals to control a plurality of power stages of the DC-to-DC converter in a manner such that (1) magnitude of current processed among respective first and second phases of each power stage is balanced and (2) magnitude of current processed among the plurality of power stages is balanced.

(J2) The method denoted as (J1) may further include generating the phase control signals such that (1) the respective first and second phases of each power stage are fired in an alternating manner. and (2) the plurality of power stages are fired in a rotating manner.

(J3) Any one of the methods denoted as (J1) and (J2) may further include controlling a duration that each phase control signal is asserted in proportion to a voltage feedback signal and in inverse proportion to a secondary input voltage signal, the voltage feedback signal representing an output voltage of the DC-to-DC converter and the secondary input voltage signal representing a switching voltage at a switching node of the DC-to-DC converter.

(J4) Any one of the methods denoted as (J1) through (J3) may further include (1) disabling one or more of the plurality of power stages in response to magnitude of a load current of the DC-to-DC converter being at a phase-shedding current threshold value and (2) enabling one or more of the plurality of power stages in response to a difference between a desired output voltage of the DC-to-DC converter and an actual output voltage of the DC-to-DC converter being at a phase-adding voltage threshold value.

(J5) Any one of the methods denoted as (J1) through (J3) may further include (a) disabling one or more of the plurality of power stages in response to magnitude of a load current of the DC-to-DC converter being at a phase-shedding current threshold value and (b) enabling one or more of plurality of power stages in response to one or more of (1) a difference between a desired output voltage of the DC-to-DC converter and an actual output voltage of the DC-to-DC converter being at a phase-adding voltage threshold value and (2) a magnitude of a load current of the DC-to-DC converter being at a phase-adding current threshold value.

(J6) Any one of the methods denoted as (J1) through (J5) may further include (1) generating a respective current difference signal for each of the plurality of power stages, each current difference signal representing at least a difference in magnitude of current flowing through first and second inductors of its respective power stage and (2) generating the phase control signals in a manner which minimizes an integral of the respective current difference signal of each of the plurality of power stages, to balance magnitude of current processed among the first and second phases of each power stage.

(J7) The method denoted as (J6) may further include generating the respective current difference signal for each of the plurality of power stages from a difference between current flowing through first and second rectification switching devices of the power stage solely when current is simultaneously flowing through each of the first and second rectification switching device of the power stage.

(J8) Any one of the methods denoted as (J6) and (J7) may further include (1) generating a respective current sum signal for each of the plurality of power stages, each current sum signal representing a sum of magnitude of current flowing through first and second inductors of its respective power stage, (2) generating one or more current balancing signals, each current balancing signal representing a difference between respective current sum signals of two power stages of the plurality of power stages; and (3) generating the phase control signals in a manner which minimizes the one or more current balancing signals, to balance magnitude of current processed among the plurality of power stages.

(J9) Any one of the methods denoted as (J1) through (J8) may further include clamping respective first and second switching nodes of each of the plurality of power stages to a power rail using a diode device for each switching node.

(K1) A method for changing number of active power stages in a direct current to direct current (DC-to-DC) converter may include (1) disabling one or more of a plurality of power stages of the DC-to-DC converter in response to a load current of the DC-to-DC converter being at a phase-shedding current threshold value, and (2) enabling one or more of the plurality of power stages in response to a difference between a desired output voltage of the DC-to-DC converter and an actual output voltage of the DC-to-DC converter being at a phase-adding voltage threshold value.

(K2) The method denoted as (K1) may further include enabling one or more of the plurality of power stages in response to a magnitude of a load current of the DC-to-DC converter being at a phase-adding current threshold value.

Changes may be made in the above-described DC-to-DC converter controllers, current doubling forward DC-to-DC converters, and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present DC-to-DC converter controllers, systems, and methods, which, as a matter of language, might be said to fall therebetween.

What is claimed is:

1. A DC-to-DC converter controller configured to generate phase control signals to control a plurality of power stages of a DC-to-DC converter where each power stage includes two phases, the DC-to-DC converter controller configured to generate the phase control signals in a manner which implements first and second levels of current balancing, where (a) in the first level, the DC-to-DC converter controller generates the phase control signals in a manner which balances magnitude of current processed among the two phases of each power stage separately for each power stage and (b) in the second level, the DC-to-DC converter controller generates the phase control signals in a manner which balances magnitude of current processed among the plurality of power stages.

2. The DC-to-DC converter controller of claim 1, wherein the DC-to-DC converter controller is further configured to generate the phase control signals such that (a) the two phases of each power stage are fired in an alternating manner and (b) the plurality of power stages are fired in a rotating manner.

3. The DC-to-DC converter controller of claim 1, wherein the DC-to-DC converter controller is further configured to control a duration that each phase control signal is asserted in proportion to a voltage feedback signal and in inverse proportion to a secondary input voltage signal, the voltage feedback signal representing an output voltage of the DC-to-DC converter and the secondary input voltage signal representing a switching voltage at a switching node of the DC-to-DC converter.

4. The DC-to-DC converter controller of claim 1, wherein the DC-to-DC converter controller is further configured to:
    disable one or more of the plurality of power stages in response to magnitude of a load current of the DC-to-DC converter being at a phase-shedding current threshold value; and
    enable one or more of the plurality of power stages in response to a difference between a desired output voltage of the DC-to-DC converter and an actual output voltage of the DC-to-DC converter being at a phase-adding voltage threshold value.

5. The DC-to-DC converter controller of claim 1 wherein the DC-to-DC converter controller is further configured to:
    disable one or more of the plurality of power stages in response to magnitude of a load current of the DC-to-DC converter being at a phase-shedding current threshold value; and
    enable one or more of the plurality of power stages in response to one or more of (1) a difference between a desired output voltage of the DC-to-DC converter and an actual output voltage of the DC-to-DC converter being at a phase-adding voltage threshold value and (2) a magnitude of a load current of the DC-to-DC converter being at a phase-adding current threshold value.

6. The DC-to-DC converter controller of claim 1, wherein for each power stage of the plurality of power stages, the DC-to-DC converter controller is further configured to trigger assertion of phase control signals for the power stage at least partially based on a comparison between:
    a sum of (a) an AC component of a respective current sum signal of the power stage, the current sum signal representing a sum of current flowing through two inductors of the power stage, (b) a voltage feedback signal representing an output voltage of the DC-to-DC converter, and (c) a voltage error signal; and
    a target voltage signal.

7. The DC-to-DC converter controller of claim 6, wherein the DC-to-DC converter controller is further configured to generate the voltage error signal from a difference between the voltage feedback signal and the target voltage signal.

8. The DC-to-DC converter controller of claim 7, wherein the DC-to-DC converter controller is further configured to include a slope signal in the voltage error signal.

9. The DC-to-DC converter controller of claim 6, wherein the DC-to-DC converter controller is further configured to adjust the target voltage signal to compensate for a voltage drop across a reference power distribution bus.

10. A method for operating a direct current to direct current (DC-to-DC) converter, comprising generating phase control signals to control a plurality of power stages of the DC-to-DC converter in a manner which implements first and second levels of current balancing, such that:
    in the first level, magnitude of current processed among respective first and second phases of each power stage is balanced separately for each power stage; and
    in the second level, magnitude of current processed among the plurality of power stages is balanced.

11. The method of claim 10, further comprising generating the phase control signals such that:
    the respective first and second phases of each power stage are fired in an alternating manner; and
    the plurality of power stages are fired in a rotating manner.

12. The method of claim 10, further comprising controlling a duration that each phase control signal is asserted in proportion to a voltage feedback signal and in inverse proportion to a secondary input voltage signal, the voltage feedback signal representing an output voltage of the DC-to-DC converter and the secondary input voltage signal representing a switching voltage at a switching node of the DC-to-DC converter.

13. The method of claim 10, further comprising:
    disabling one or more of the plurality of power stages in response to magnitude of a load current of the DC-to-DC converter being at a phase-shedding current threshold value; and
    enabling one or more of the plurality of power stages in response to a difference between a desired output voltage of the DC-to-DC converter and an actual output voltage of the DC-to-DC converter being at a phase-adding voltage threshold value.

14. The method of claim 10, further comprising:
disabling one or more of the plurality of power stages in response to magnitude of a load current of the DC-to-DC converter being at a phase-shedding current threshold value; and
enabling one or more of the plurality of power stages in response to one or more of (1) a difference between a desired output voltage of the DC-to-DC converter and an actual output voltage of the DC-to-DC converter being at a phase-adding voltage threshold value and (2) a magnitude of a load current of the DC-to-DC converter being at a phase-adding current threshold value.

15. The method of claim 10, further comprising:
generating a respective current difference signal for each of the plurality of power stages, each current difference signal representing at least a difference in magnitude of current flowing through first and second inductors of its respective power stage; and
generating the phase control signals in a manner which minimizes an integral of the respective current difference signal of each of the plurality of power stages, to balance magnitude of current processed among the first and second phases of each power stage.

16. The method of claim 15, further comprising generating the respective current difference signal for each of the plurality of power stages from a difference between current flowing through first and second rectification switching devices of the power stage solely when current is simultaneously flowing through each of the first and second rectification switching device of the power stage.

17. The method of claim 15, further comprising:
generating a respective current sum signal for each of the plurality of power stages, each current sum signal representing a sum of magnitude of current flowing through first and second inductors of its respective power stage;
generating one or more current balancing signals, each current balancing signal representing a difference between respective current sum signals of two power stages of the plurality of power stages; and
generating the phase control signals in a manner which minimizes the one or more current balancing signals, to balance magnitude of current processed among the plurality of power stages.

18. The method of claim 10, further comprising clamping respective first and second switching nodes of each of the plurality of power stages to a power rail using a diode device for each switching node.

19. The DC-to-DC converter controller of claim 1, comprising:
current balancing circuitry configured to generate at least a first current balancing signal;
a first two-phase controller configured to balance magnitude of current processed among respective two phases of the DC-to-DC converter; and
a second two-phase controller configured to (a) balance magnitude of current processed among respective two phases of the DC-to-DC converter and (b) balance magnitude of current processed among two power stages of the plurality of power stages of the DC-to-DC converter, according to the first current balancing signal.

20. The DC-to-DC converter controller of claim 19, wherein:
the current balancing circuitry comprises (a) a subtraction block configured to generate a difference signal from two current sum signals, (b) an amplifier/attenuator configured to buffer the difference signal, and (c) summation block configured to sum the difference signal and a voltage feedback signal to generate the first current balancing signal;
the first two-phase controller comprises (a) first trigger circuitry configured to generate a first trigger signal based at least partially on the voltage feedback signal, a voltage error signal, a target voltage signal, and a first current sum signal, (b) first adjustment circuitry configured to generate a first adjustment signal based on a sum of a first current difference signal and the voltage feedback signal, and (c) first power stage control logic configured to generate first and second phase control signals based on at least the first trigger signal, the first adjustment signal, and the voltage feedback signal; and
the second two-phase controller comprises (a) second trigger circuitry configured to generate a second trigger signal based at least partially on the voltage feedback signal, the voltage error signal, the target voltage signal, and a second current sum signal, (b) second adjustment circuitry configured to generate a second adjustment signal based on a sum of a second current difference signal and the first current balancing signal, and (c) second power stage control logic configured to generate third and fourth phase control signals based on at least the second trigger signal, the second adjustment signal, and the first current balancing signal.

* * * * *